(12) United States Patent
Munk et al.

(10) Patent No.: US 6,170,157 B1
(45) Date of Patent: Jan. 9, 2001

(54) DETERMINANT SPAR ASSEMBLY

(75) Inventors: Clayton L. Munk, Maple Valley; Paul E. Nelson, University Place; David E. Strand, Newcastle, all of WA (US)

(73) Assignee: The Boeing Company, Seattle, WA (US)

( * ) Notice: Under 35 U.S.C. 154(b), the term of this patent shall be extended for 0 days.

(21) Appl. No.: 09/155,236

(22) PCT Filed: Mar. 21, 1997

(86) PCT No.: PCT/US97/04453

§ 371 Date: Sep. 21, 1998

§ 102(e) Date: Sep. 21, 1998

(87) PCT Pub. No.: WO97/34733

PCT Pub. Date: Sep. 25, 1997

Related U.S. Application Data

(60) Provisional application No. 60/013,986, filed on Mar. 22, 1996.

(51) Int. Cl.[7] .................................................... B21D 53/88
(52) U.S. Cl. ............... 29/897.2; 29/907.01; 29/525.05; 29/281.6; 244/123; 244/124
(58) Field of Search ................................ 29/281.1, 281.6, 29/407.01, 407.04, 407.05, 407.09, 407.1, 525.02, 525.05, 559, 897, 897.2, 281.5, 464, 468; 244/123, 124; 269/37, 41, 47, 52, 152, 228; 408/1 R, 13

(56) References Cited

U.S. PATENT DOCUMENTS

| 1,989,141 | * | 1/1935 | Leonard . |
| 2,324,435 | * | 7/1943 | Smith . |
| 5,168,453 | * | 12/1992 | Nomaru et al. . |
| 5,246,316 | * | 9/1993 | Smith . |

* cited by examiner

Primary Examiner—Irene Cuda
(74) Attorney, Agent, or Firm—J. Michael Neary

(57) ABSTRACT

A method and apparatus for manufacturing wing spars includes a fixture that holds spar webs for drilling and edge trimming by accurate numerically controlled machine tools using original numerical part definition records, utilizing spatial relationships between key features of detail parts or subassemblies as represented by coordination features machined into the parts and subassemblies, thereby making the parts and subassemblies intrinsically determinant of the dimensions and contour of the wing.

33 Claims, 31 Drawing Sheets

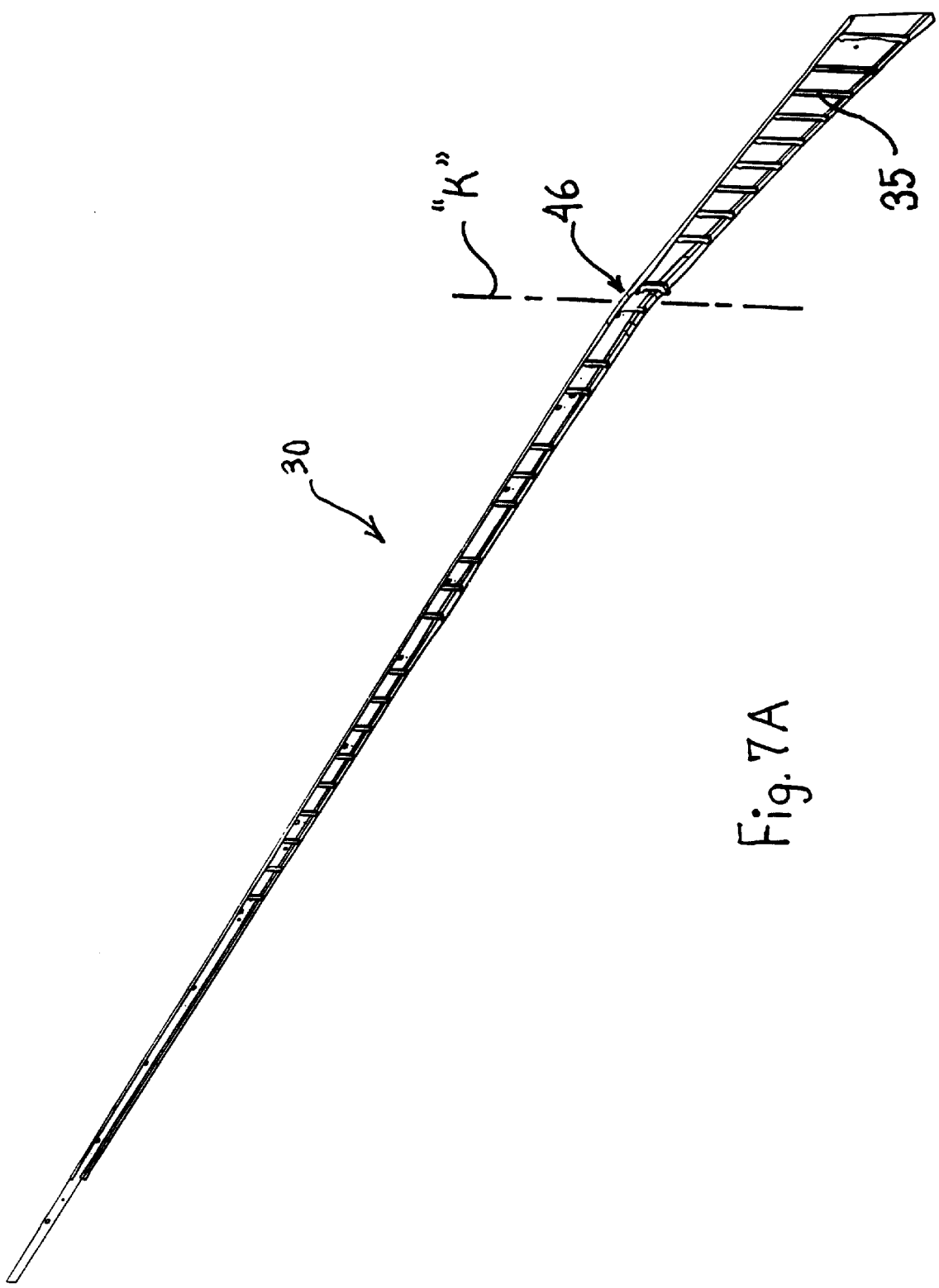

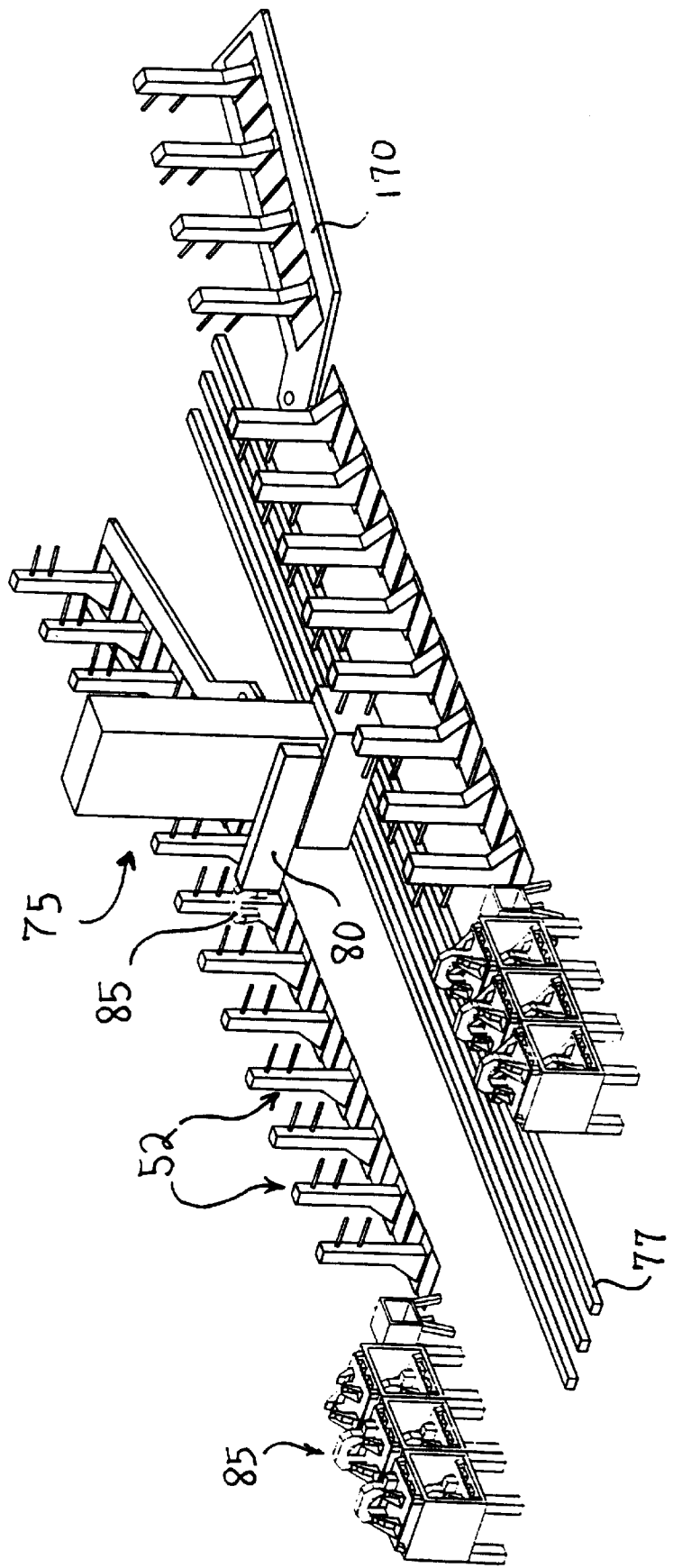

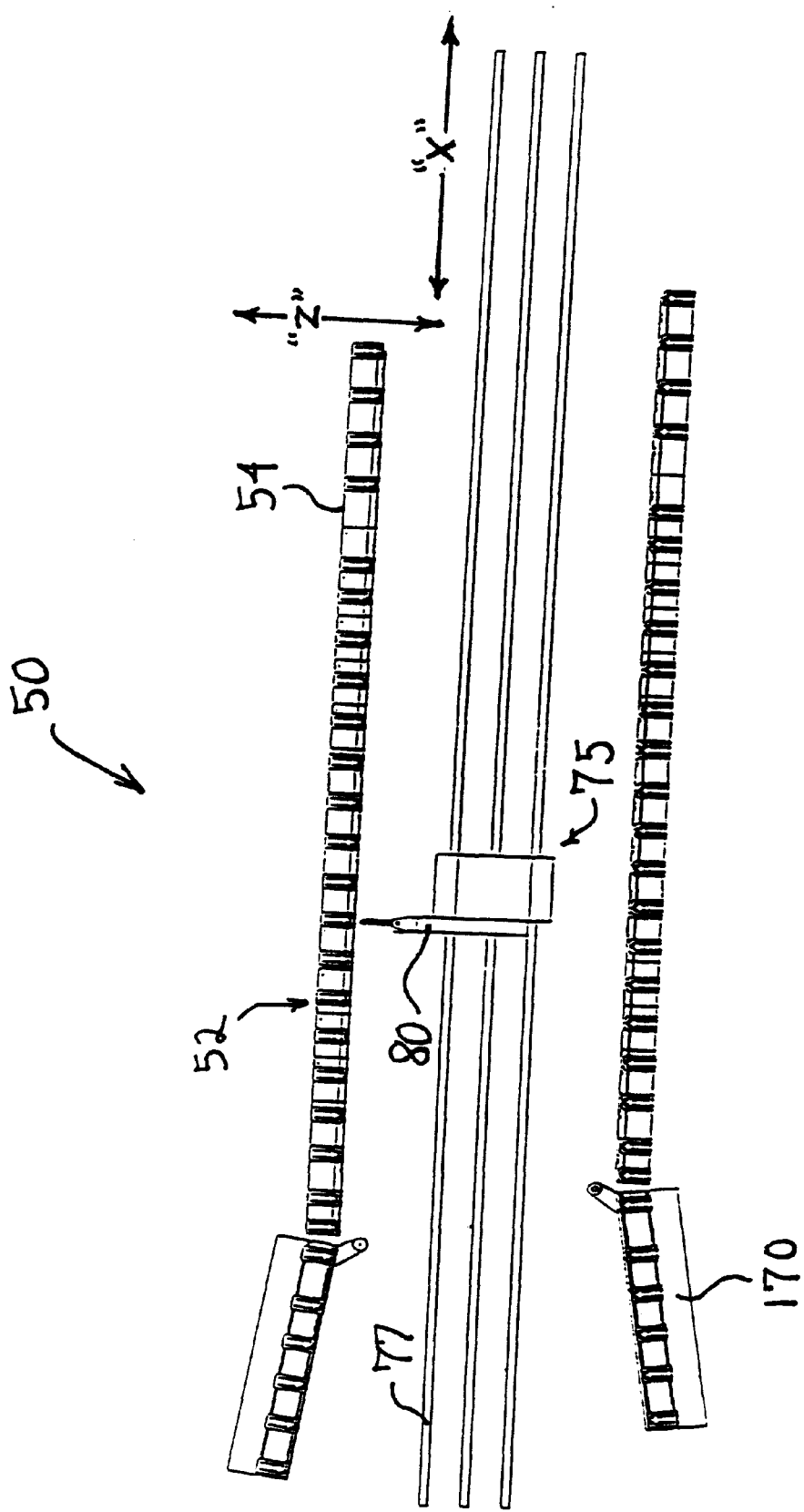

DETERMINANT SPAR ASSEMBLY

REFERENCE TO RELATED APPLICATIONS

This application relates to a U.S. Provisional Application Ser. No. 60/013,986 entitled "Determinant Wing Assembly" filed on Mar. 22, 1996 by David Strand, Clayton Munk and Paul Nelson.

TECHNICAL FIELD

This invention relates to a method and apparatus for assembling wing spars and ribs to close tolerances, and more particularly, to a method and apparatus for assembling wing spars and ribs with extreme and unprecedented precision to produce wing components having extremely close conformance to the original engineering design, with significantly reduce tooling expense.

BACKGROUND OF THE INVENTION

Conventional manufacturing techniques for assembling airplane wing spars and ribs to a specified contour rely on fixtured "hardpoint" tooling techniques utilizing floor assembly jigs and templates to locate and temporarily fasten detailed structural parts together to locate the parts correctly relative to one another. This traditional tooling concept usually requires primary assembly tools for each subassembly produced, and two large spar assembly tools (left and right) in which the subassemblies are assembled into an assembled spar.

The tooling is intended to accurately reflect the original engineering design of the product, but using the conventional tooling concept in which the tooling sets the configuration of the final assembly, there are many steps between the original design of the product and the final manufacture of the tool. It is not unusual that the tool as finally manufactured produces missized spars or wing components that would be outside of the dimensional tolerances of the original spar or spar component design without extensive, time consuming and costly hand work to correct the tooling-induced errors. More seriously, a tool that was originally built within tolerance can become out of tolerance from the hard use it typically receives in the factory. Moreover, dimensional variations caused by temperature changes in the factory can produce a variation in the final part dimensions as produced on the tool, particularly when a large difference in the coefficient of thermal expansion exists between the tooling and the spar, as in the usual case where the tooling is made of steel and the spar components are made of aluminum. Since dimensions in airplane construction are often controlled to within 0.005", temperature induced dimensional variations can be significant.

Hand drilling of the part on the tool can produce holes that are not perfectly round or normal to the part surface when the drill is presented to the part at an angle that is slightly nonperpendicular to the part, and also when the drill is plunged into the part with a motion that is not perfectly linear. Parts can shift out of their intended position when they are fastened in non-round holes, and the nonuniform hole-to-fastener interference in a non-round hole lacks the strength and fatigue durability of round holes. The tolerance buildup on the spar subassemblies can result in significant growth from the original design dimensions, particularly when the part is located on the tool at one end of the part, forcing all of the part variation in one direction instead of centering it over the true intended position.

Spar components are typically fastened together with high interference fasteners and/or fasteners in cold worked holes. Interference fasteners, such as rivets and lock bolts, and cold working of a fastener hole, both create a pattern of stress in the metal around the hole that improves the fatigue life of the assembled joint, but a long line of such stress patterns causes dimensional growth of the assembly, primarily in the longitudinal direction, and also can cause an elongated part to warp, or "banana" along its length. Attempts to restrain the assembly to prevent such distortion are generally fruitless, so the most successful technique to date has been to attempt to predict the extent of the distortion and account for it in the original design of the parts, with the intent that the assembly will distort to a shape that is approximately what is called for in the design. However, such predictions are only approximations because of the naturally occurring variations in the installation of fasteners and the cold working of holes, so there is often a degree of unpredictability in the configuration of the final assembly. A process for washing out the effects of the distortion in the subassemblies before they are fastened into the final assembly has long been sought and would be of significant value in spar manufacturing, as well as in the manufacture of other parts of the airplane.

Wing major spar tooling is expensive to build and maintain within tolerance, and requires a long lead time to design and build. The enormous cost and long lead time to build wing spar tooling is a profound deterrent to redesigning the wing of an exist model airplane, even when new developments in aerodynamics are made, because the new design would necessitate rebuilding the wing spar tools. One existing system for automatic drilling, fastener installation and tightening is shown in U.S. Pat. No. 5,479,698 by Banks et al. entitled "Automated Spar Assembly Tool". It produces spars accurately, but is a costly system to build and maintain.

The capability of quickly designing and building spars for custom wings for airline customers having particular requirements not met by existing airplane models would give an airframe manufacturer an enormous competitive advantage. Currently, that capability does not exist because the cost of the dedicated wing and wing spar tooling and the factory floor space that such tooling would require make the cost of "designer wings" prohibitively expensive. However, if the same tooling that is used to make the standard wing spar for a particular model could be quickly and easily converted to building spars for custom wings that meet the particular requirements of a customer, and then converted back to the standard model or another custom wing design, airplanes could be offered to customers with wings optimized specifically to meet their specific requirements. The only incremental cost of the new wing would be the engineering and possibly some modest machining of headers and other low cost tooling that would be unique to that wing design.

The disadvantages of manufacturing processes using hard tooling are inherent. Although these disadvantages can be minimized by rigorous quality control techniques, they will always be present to some extent in the manufacture of large mechanical structures using hard tooling. A determinant assembly process has been developed for airplane fuselage manufacture, replacing hardpoint tooling with self-locating detail parts that determine the configuration of the assembly by their own dimensions and certain coordinating features incorporated into the design of the parts. This new process, shown in U.S. Pat. No. 5,560,102 entitled "Panel and Fuselage Assembly" by Micale and Strand, has proven to produce far more accurate assemblies with much less rework. Application of the determinant assembly process in airplane wing spar manufacture should yield a better process that eliminates or minimizes the use of hard tooling while increasing both the production capacity of the factory and increasing the quality of the product by reducing part variability while reducing the costs of production and providing flexibility in making fast design changes available to its customers. These improvements would be a great boon to airframe manufacturers and their customers, and improve the competitive position of the manufacturer in the marketplace. The present invention is a significant step toward such a process.

SUMMARY OF THE INVENTION

Accordingly, it is an object of this invention to provide a method of manufacturing long, large and heavy assemblies such as airplane wing spars and ribs from flexible and semi-flexible parts and subassemblies in accordance with an original engineering design instead of the tooling.

Another object of the invention is to provide a method of manufacturing airplane wing spars and ribs using intrinsic features of the component parts to allow them to self locate and determine assembly dimensions and contours rather than using conventional tooling to determine the placement of the parts relative to one another and the contour of the assembly.

It is yet another object of this invention to provide a system for manufacturing airplane wing spars that is inherently more accurate than the prior art and produces structures in which the parts are consistently located more accurately on the structure with closer conformance to the tolerance specified by the engineering design.

It is yet a further object of the invention to provide a system for manufacturing airplane wing spars that is faster, more flexible, and less expensive than the prior art traditional techniques and requires less factory space and is less dependent upon the skill of workers to produce parts within the engineering tolerances specified.

Still a further object of this invention is to provide a method and apparatus which facilitates the manufacturing of airplane wing spars with a precision and consistency that enables airplane wings to be built within tolerance specified in the original engineering design.

Another still further object of the invention is to provide a method for building airplane wing spars having a sequence of operations arranged to apply critical features to the detail parts or subassemblies after the spar or spar component has been distorted by operations, such as installation of interference fasteners, that distort the spar or spar component.

These and other objects of the invention are attained in a system for assembling wing spars and other long, large, and heavy assemblies from flexible and semi-flexible parts using a method that utilizes spatial relationships between key features of detail parts as represented by coordination features such as holes and machined surfaces drilled or machined into the parts by accurate numerically controlled machine tools using digital data from original engineering product definition, thereby making the components and subassemblies themselves intrinsically determinant of the dimensions and contour of the wing spar.

DESCRIPTION OF THE DRAWINGS

The invention and its many attendant objects and advantages will become better understood upon reading the following detailed description of the preferred embodiment in conjunction with the following drawings, wherein:

FIG. 7A is a perspective view of a spar built in accordance with the process and on the apparatus of this invention;

FIG. 8 is a perspective schematic view of a wing spar assembly cell in accordance with this invention;

FIG. 9 is a plan view of the wing spar assembley cell shown in FIG. 8

DESCRIPTION OF THE PREFERRED EMBODIMENT

Figure 1:
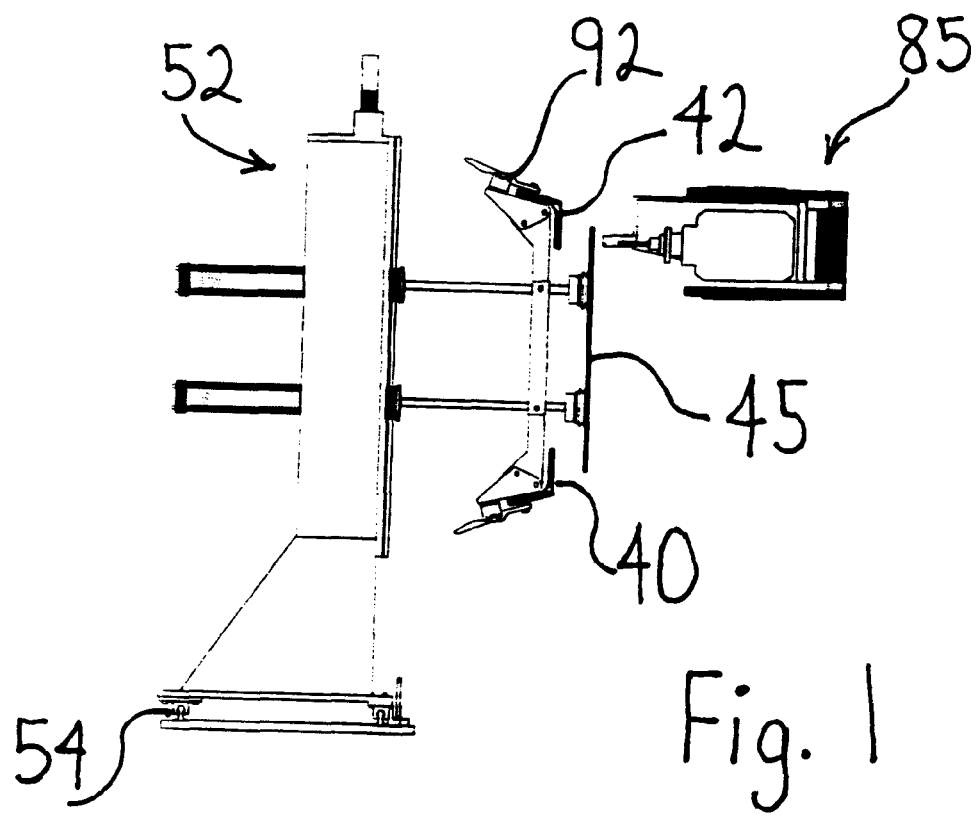
FIGS. 1–6 are sequential schematic diagrams showing the major assembly steps performed on the spar web and other components while they are supported on a line of stanchions, shown in FIG. 8, during assembly of an airplane wing spar in accordance with this invention.
Figure 2:
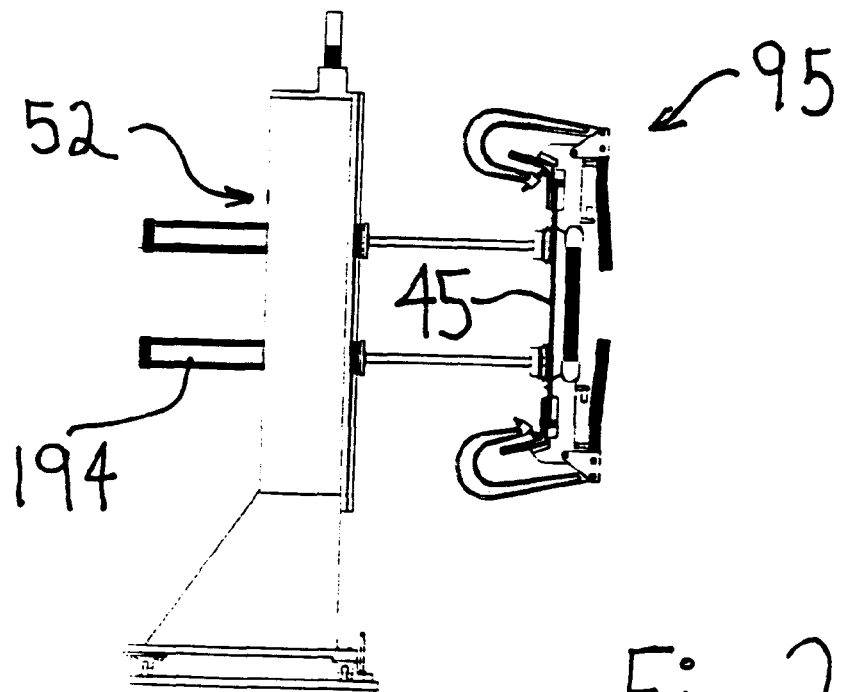
Figure 3:
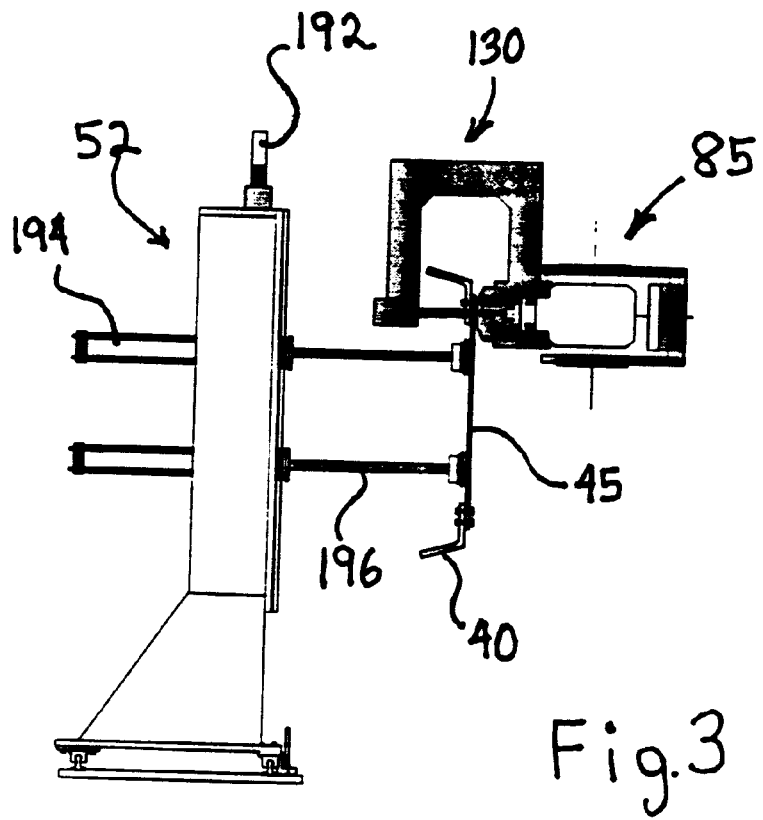
Figure 4:
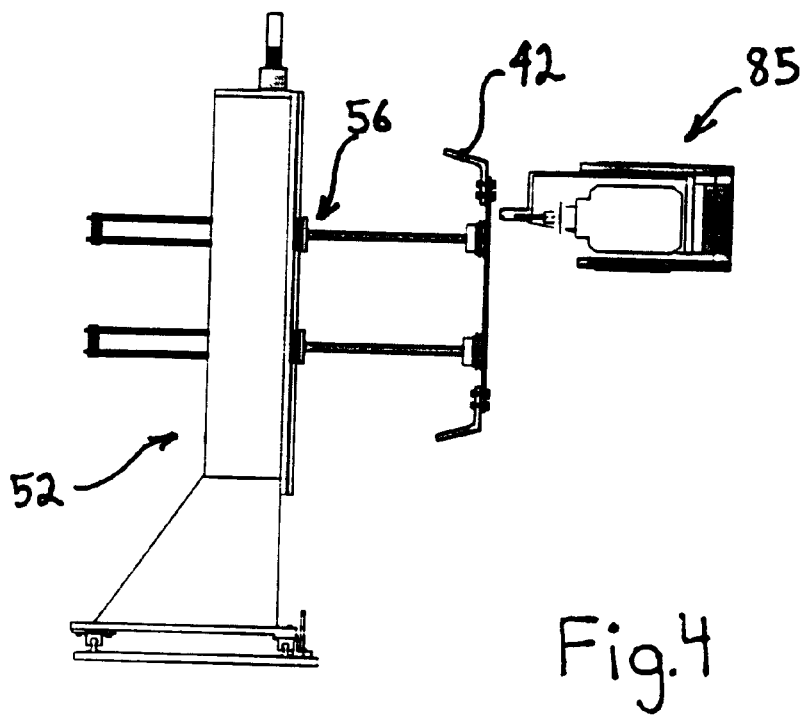

Referring now to the drawings, like reference characters designate identical or corresponding parts. The invention is described as applied to a preferred embodiment, namely, a process of assembling airplane wing spars. However, it is contemplated that this invention has application to the assembly of parts into major assemblies, generally, where adherence to a specified set of dimensional tolerances and final product contours and dimensions is desired. The invention has particular relevance where some or all of the parts and subassemblies are flexible or semi-flexible.

A previous embodiment of this invention was described in a Provisional Application Ser. No. 60/013,986 entitled "Determinant Wing Assembly" filed on Mar. 22, 1996. The embodiment of the invention described herein is the preferred embodiment and the best mode contemplated by us for practicing the inventive process. However, it should be understood that the scope of this invention encompasses both of these embodiments and other variations and modifications thereof which will occur to those skilled in the art in view of these two disclosures.

The assembly process will first be briefly summarized as applied in a wing spar assembly cell, with reference to a sequence of schematic diagrams, FIGS. 1–6, illustrating the major process steps in the determinant wing spar assembly process according to this invention. After this brief overview, the spar assembly cell in which the process is performed will be described and the process will be explained in further detail.

To provide context for the following description of the process and apparatus of the invention, a representative airplane wing spar will be described. Normally, an airplane wing includes two spars 30 extending lengthwise, or "spanwise", of the wing and spaced apart in a "chordwise" direction. One spar, called the "front" spar, lies adjacent the leading edge of the wing, and the other spar, called the "rear" spar, lies adjacent the trailing edge of the wing. Wing ribs extend chordwise between the spars 30 and are fastened to vertical rib posts 35, shown in FIGS. 7A and 7B, which are adhered and sealed to the spars 30 and fastened thereto by numerous fasteners. Top and bottom chords 40 and 42 are adhered and sealed to top and bottom edges of a spar web 45, and fastened thereto with numerous fasteners such as rivets, bolts, lock bolts, Hi-Locks, and the like, which are widely used in the aerospace industry, and are well understood and reliable. These fasteners will be referred to herein as "bolts and/or rivets" which is used herein to mean that the fasteners could be all bolts, or all rivets, or a combination of bolts and rivets. Naturally, the invention is not confined to the used of these conventional fasteners and it should be understood that other fasteners may be used as they are developed in place of these conventional fasteners.

Figure 7B:
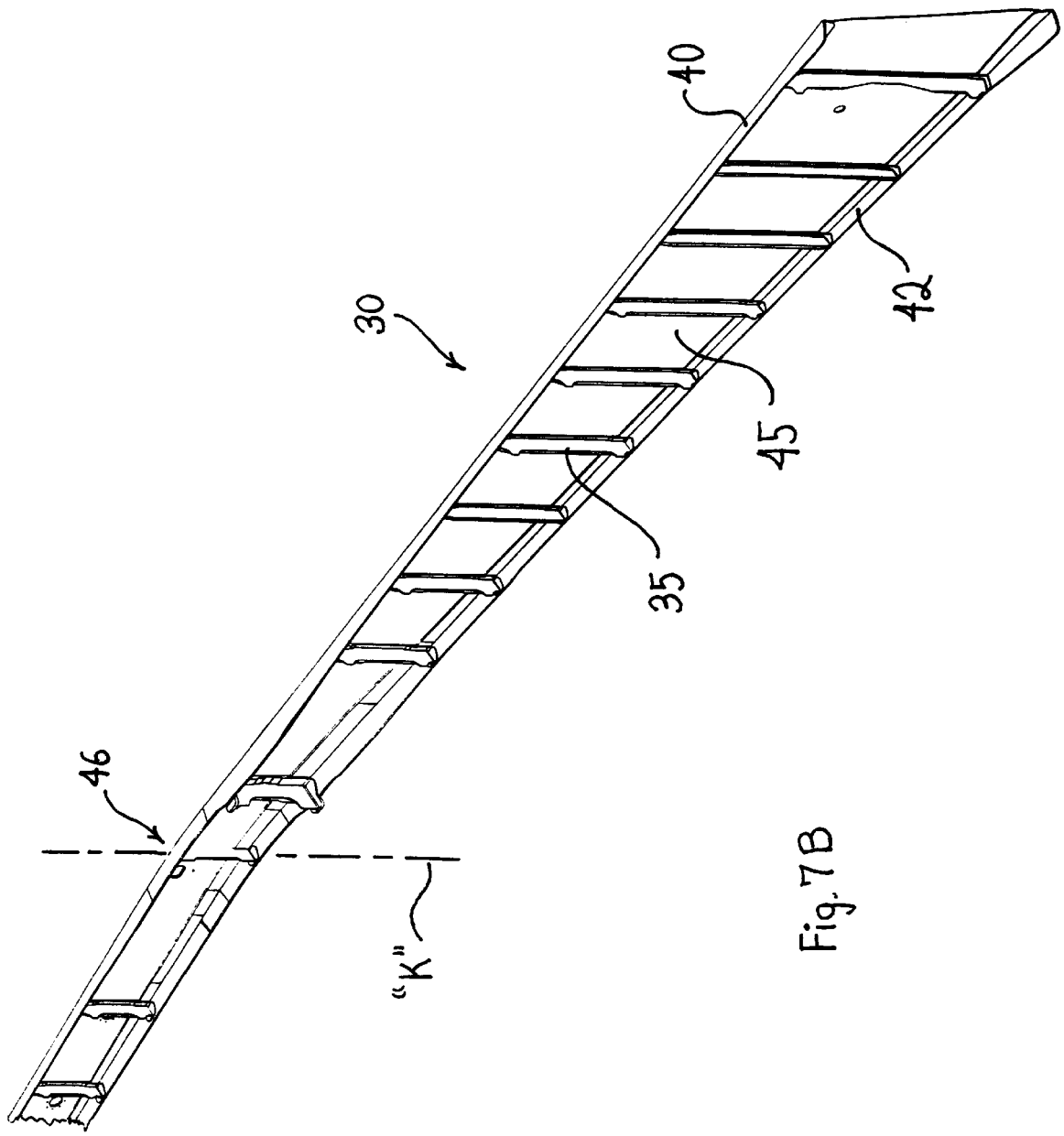
FIG. 7B is an enlarged perspective view of the inboard end of the spar shown in FIG. 7A.

The top and bottom chords 40 and 42 each have a vertical flange that is secured to the spar web 45, and an angled top or bottom flange to which a top or bottom wing panel is attached. The vertical position of the chords 40 and 42 on the web 45 is critical because it determines the spacing at the spars 30 between the top and bottom wing panels. Likewise, the position of the rib posts 35 on the spar is critical because they determine the position of the ribs which in turn determine the contour of the wing panel. A bend or "kink" 46 at a "K" axis, shown in FIGS. 7A and 7B, is found on most wing spars so that the spars can conform to the designed position of the front and rear outside edges of the wing box.

The space defined between the front and rear wing spars and the top and bottom wing panels, that is, the outside structural elements of the wing box, is normally used as the airplane fuel tank, so the inside surfaces of the wing spars are commonly refered to as the "wet" sides and the outside surfaces are refered to as the "dry" sides. That convention will be used herein. The rib posts 35 are attached to the wet side of the spar and a multiplicity of vertical stiffeners 47 are adhered and sealed to the dry side of the spar web 45 and fastened thereto by a multiplicity of fasteners. A more complete description of the construction of an airplane wing, and some additional components attached to the wing spars, can be found in the aforesaid Provisional Application Ser. No. 60/013,986 and in a corresponding PCT Application filed concurrently herewith.

Figure 10:
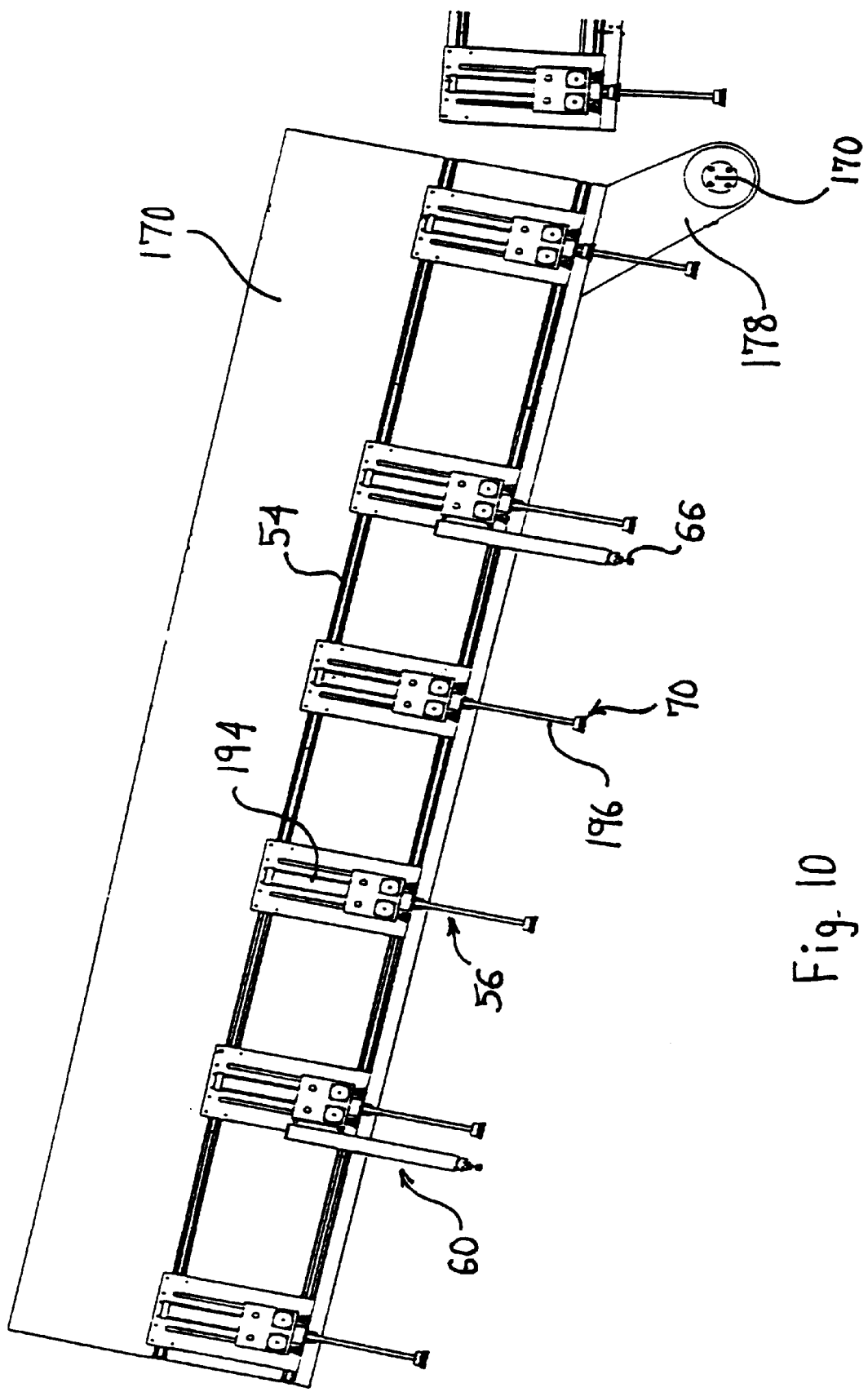
FIG. 10 is a plan view of one side of the wing spar assembly cell shown in FIG. 8, in the region of the bend.
Figure 11:
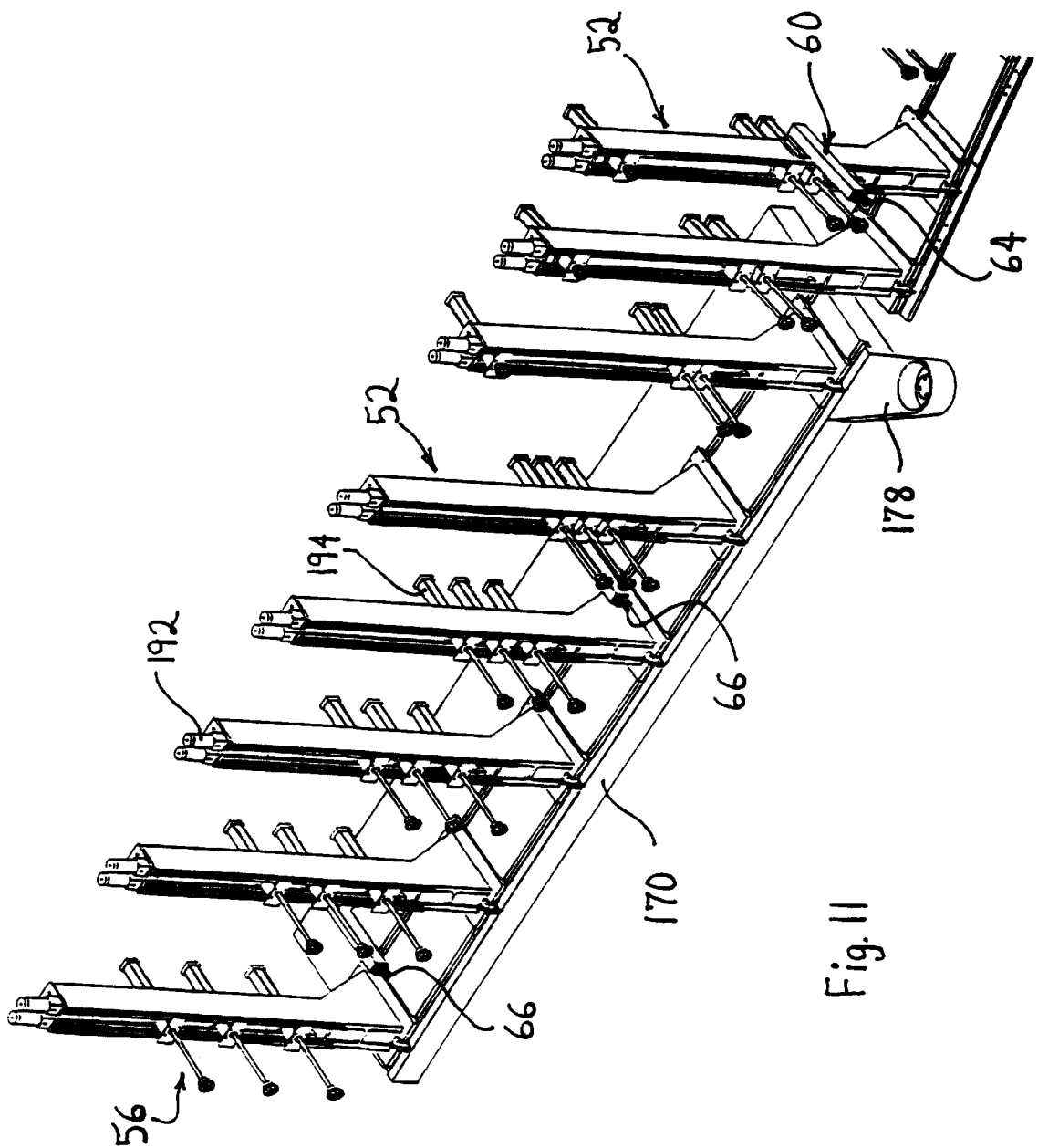
FIG. 11 is a perspective view the portion of the spar assembly cell assembly cell shown in FIG. 10.
Figure 12:
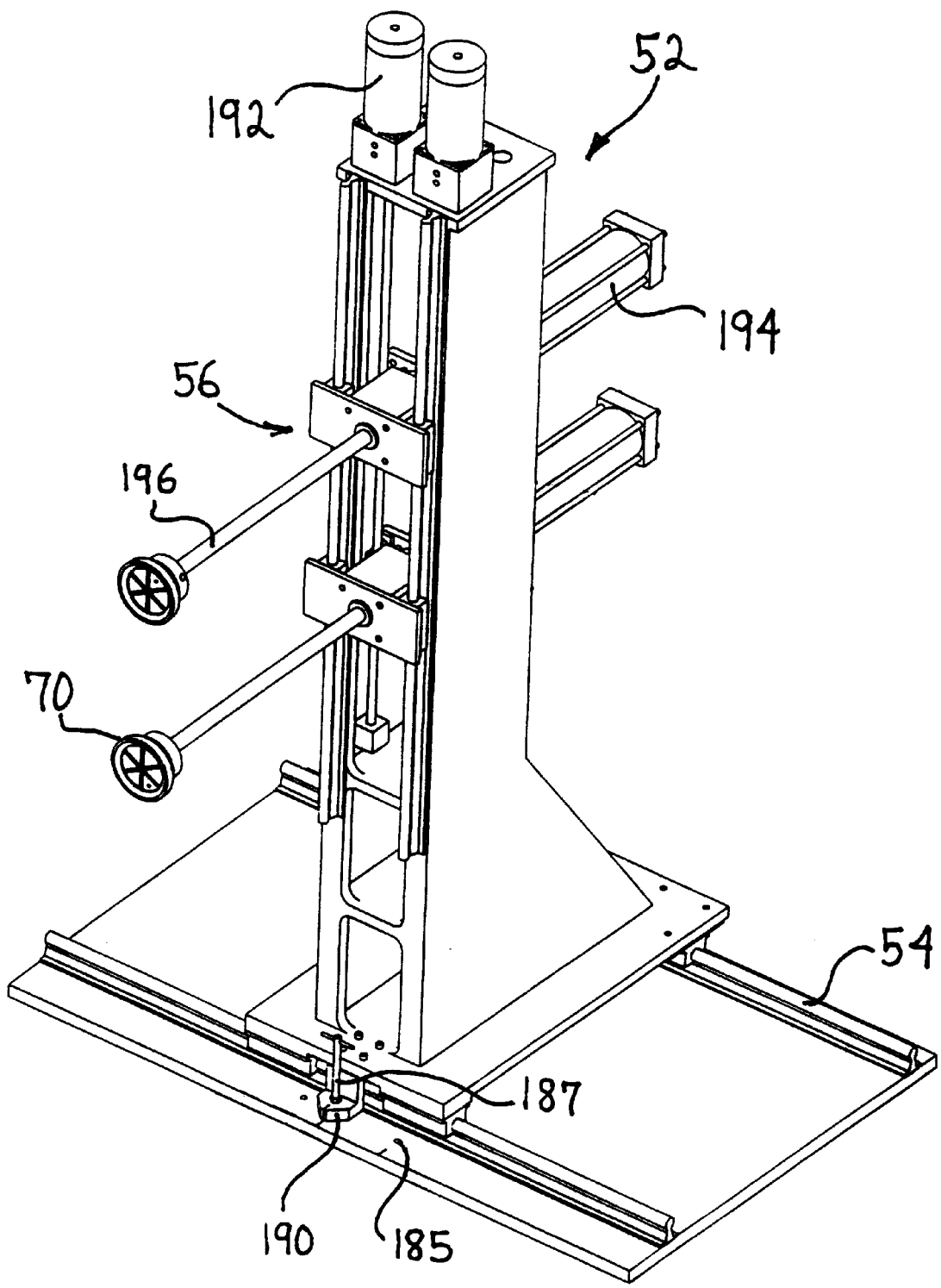
FIG. 12 is a perspective view of one of the stanchions shown in FIG. 11.
Figure 13:
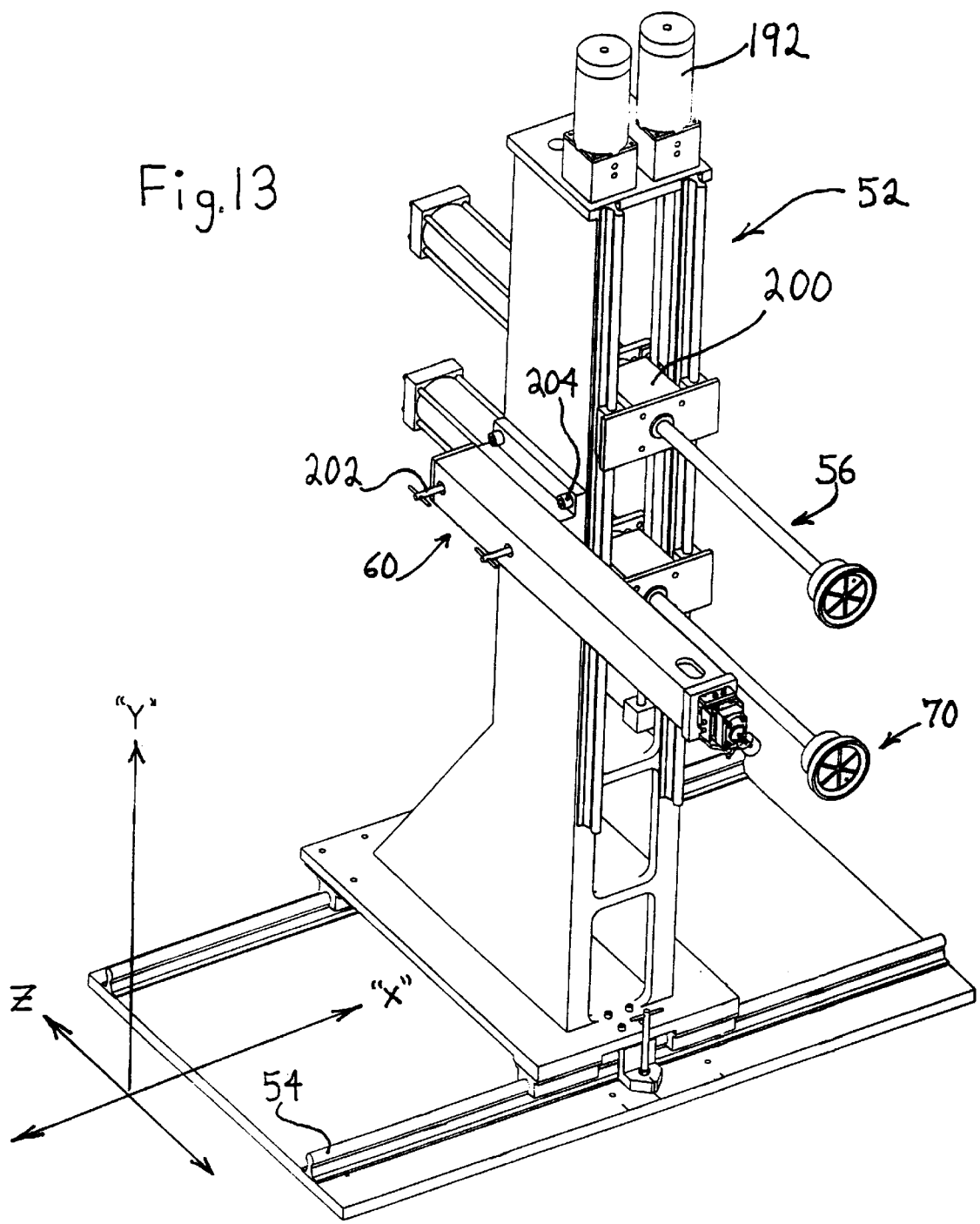
FIG. 13 is a perspective view of one of the stanchions having a spar web support arm shown in FIG. 11.
Figure 14:
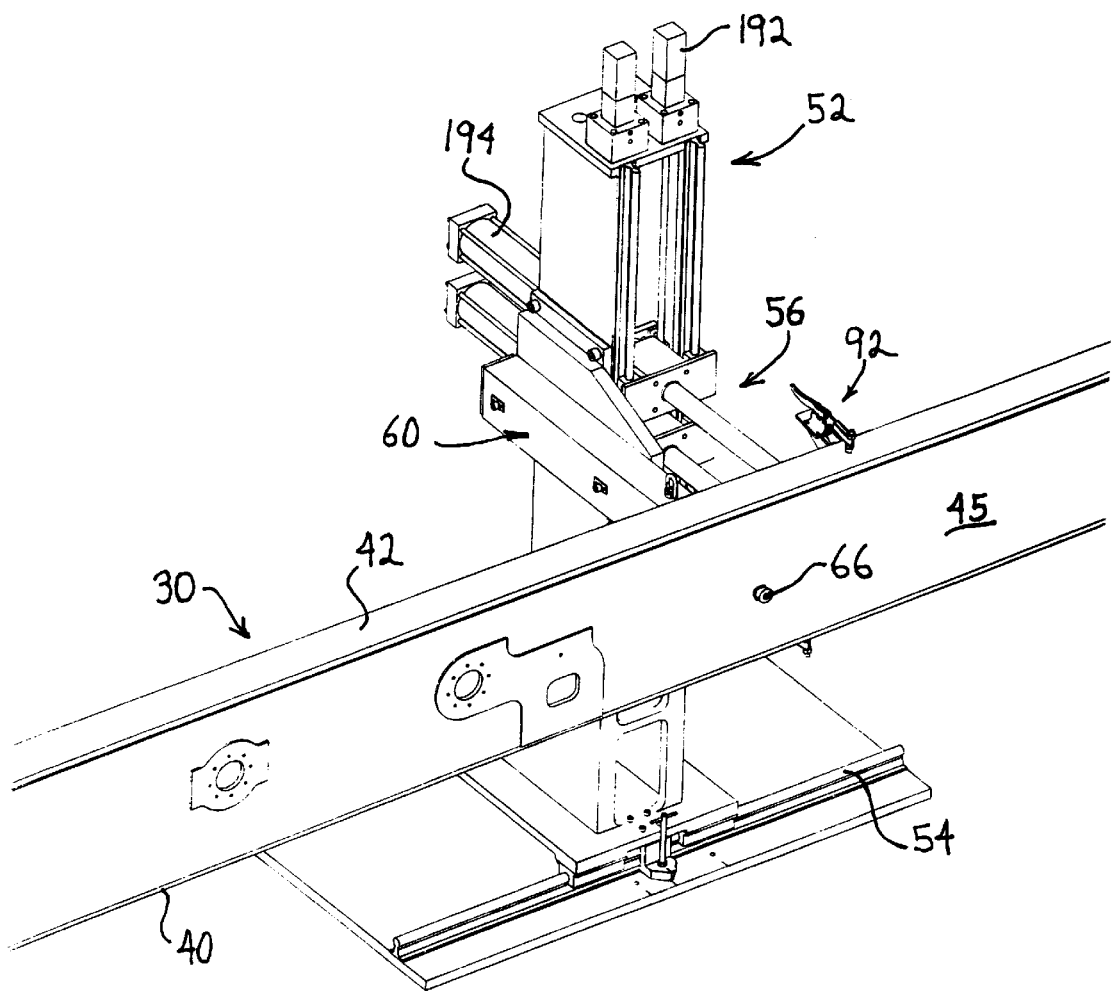
FIG. 14 is a perspective view of a slightly modified spar support stanchion showing the clamps of temporary chord locators.
Figure 15:
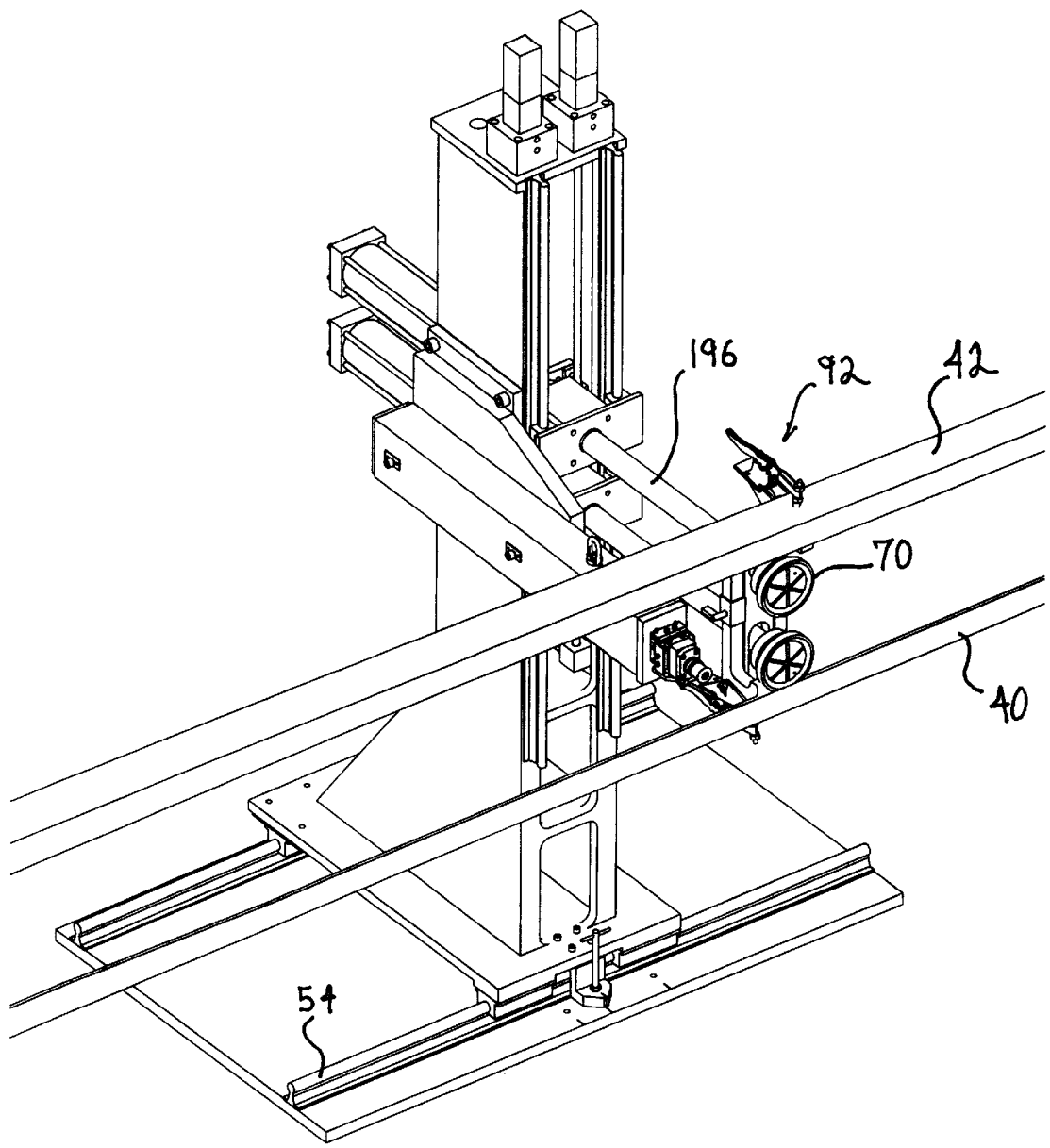
FIG. 15 is a view like FIG. 14, but showing the spar web removed for purposes of illustration.
Figure 16:
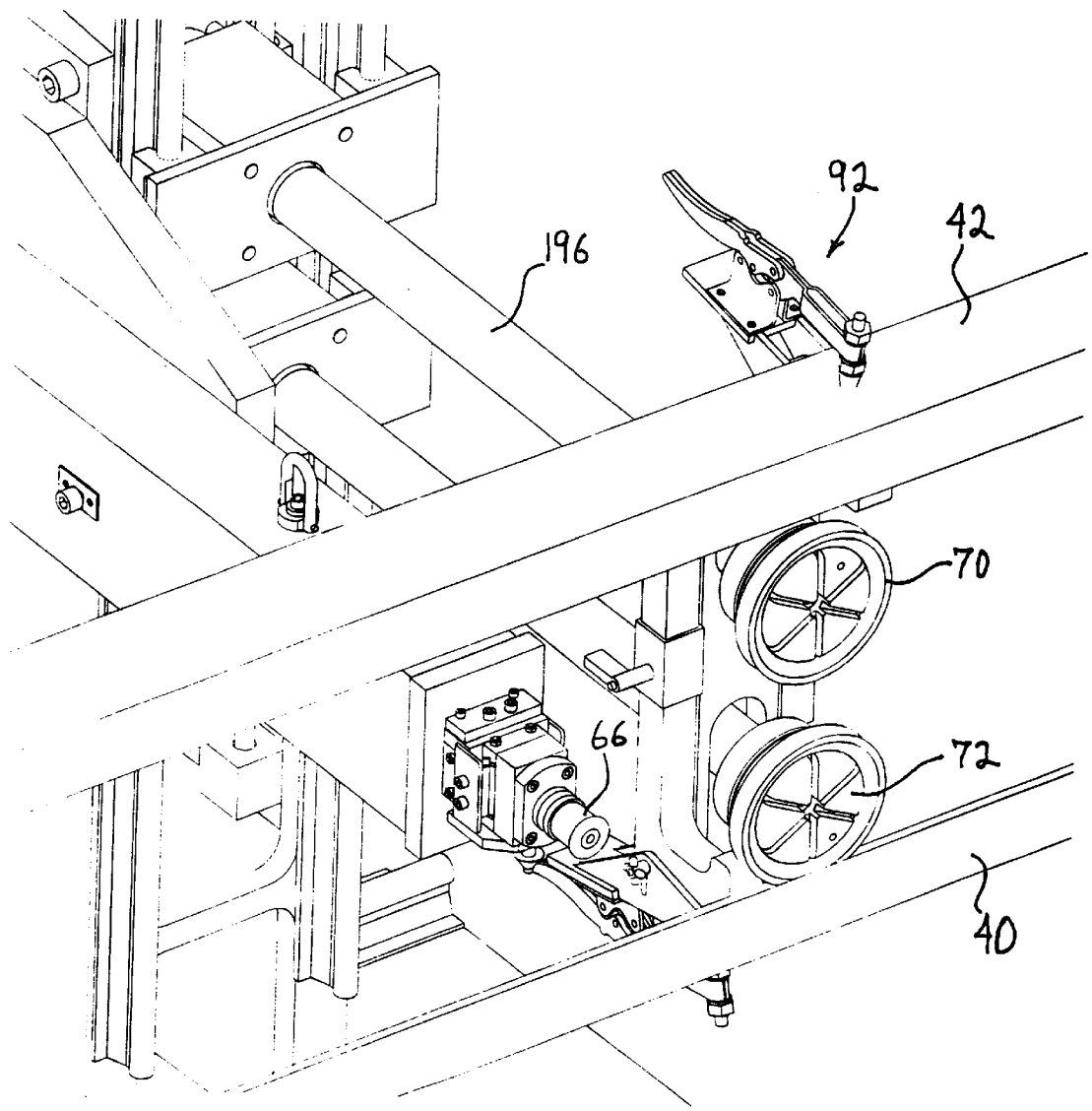
FIG. 16 is an enlarged view of a portion of FIG. 15.
Figure 17:
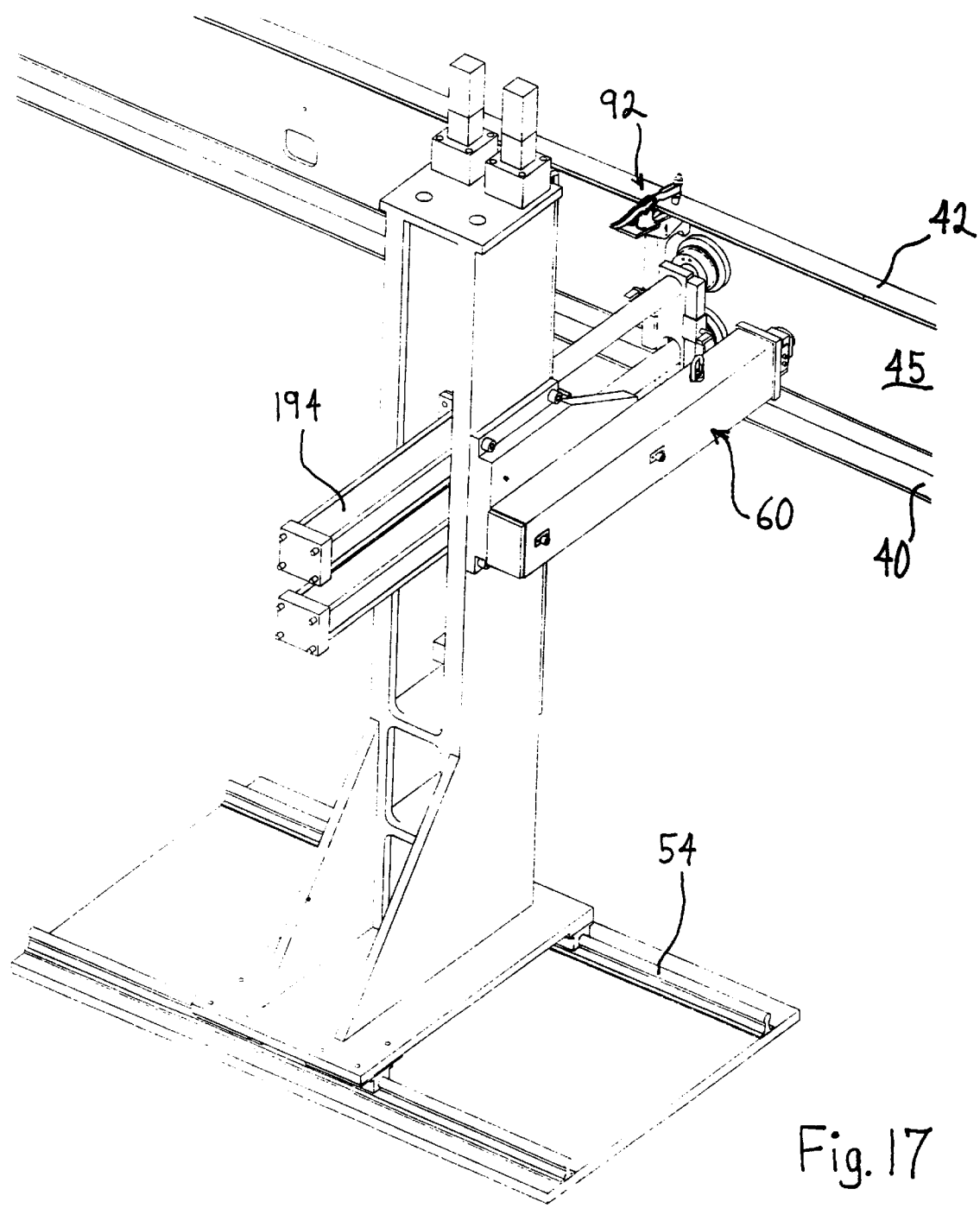
FIG. 17 is a perspective view of the back right side of the structure shown in FIG. 14.
Figure 18:
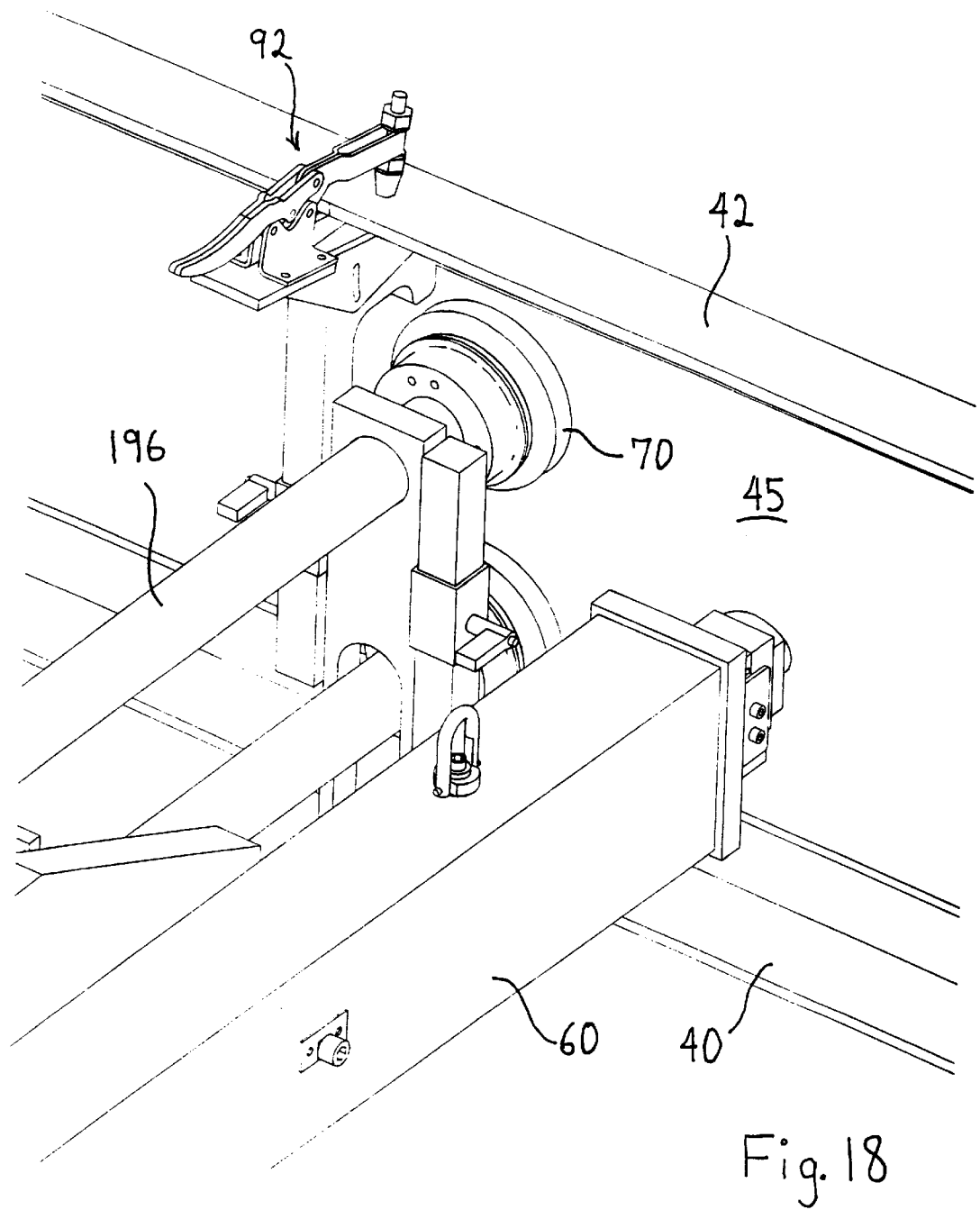
FIG. 18 is an enlarged perspective view of a portion of FIG. 17.
Figure 19:
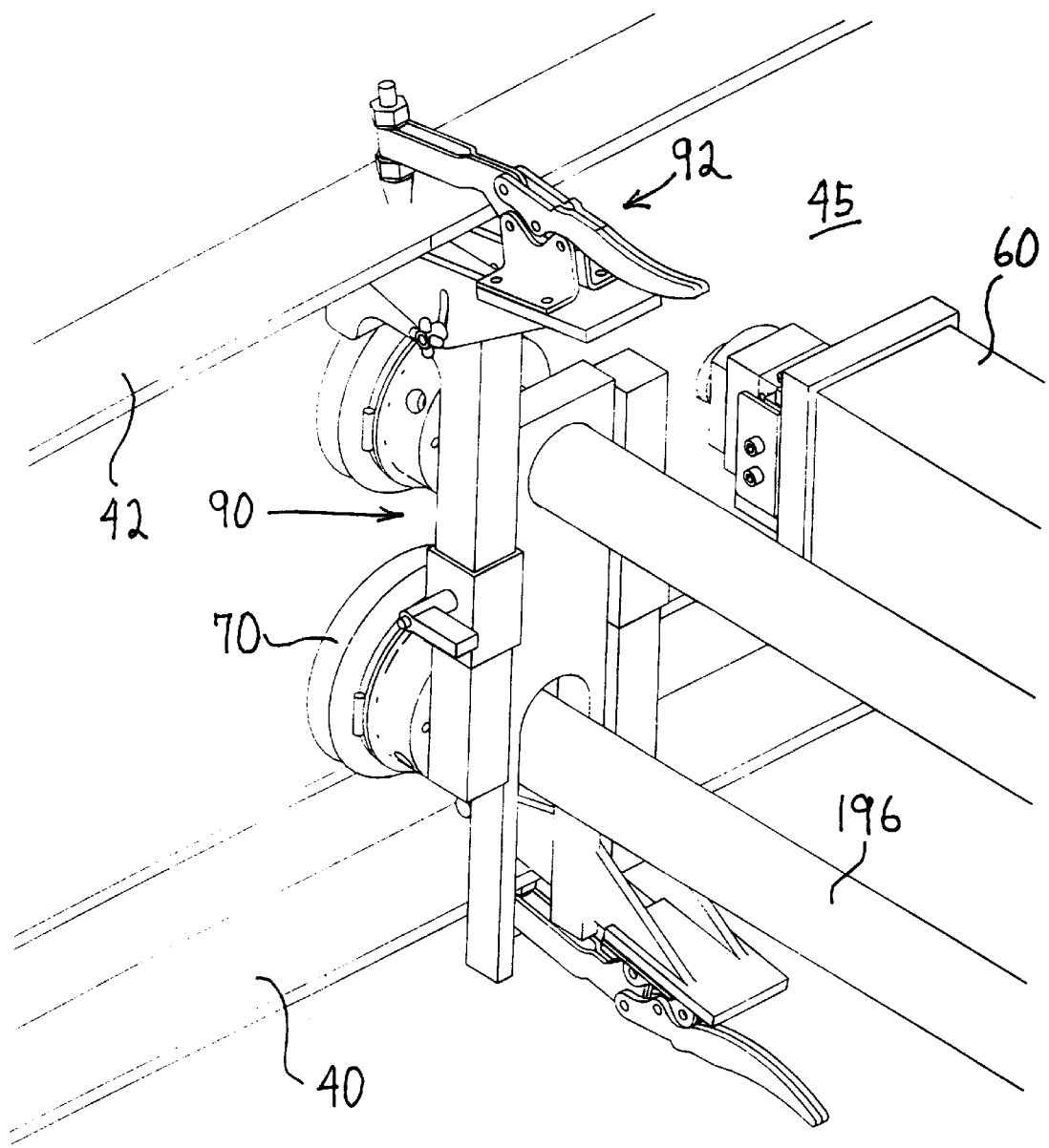
FIG. 19 is an enlarged perspective view of the back left side of the structure shown in FIG. 18.

A spar assembly process in accordance with this invention for assembling an airplane wing spar 30 begins with configuring a reconfigurable assembly cell 50, shown in FIGS. 8 and 9, for the particular size and design of the wing spar to be assembled in the cell 50. The assembly cell has a line of stanchions 52 mounted on rails 54, as shown in FIGS. 10 and 11, so the stanchions can be moved in the "X" direction parallel to the plane of the spar 30 to position them at the desired position lengthwise of the spar. Two or more lateral positioning devices, such as the "pogo" devices 56 illustrated in FIGS. 12 and 13, are mounted on each of the stanchions 52 for establishing the lateral position of a spar web 45 in the "Z" direction in the cell 50. A support arm 60 is attached to selected ones of the stanchions 52 along the row of stanchions, as shown in FIGS. 10 and 11, to carry the weight of the spar web 45. A primary index pin 64 in the end of one of the support arms 60 is received in a coordination hole predrilled in the spar web 45 to position the web accurately on the stanchions in the "X" and "Y" directions, in an orientation that is longitudinally horizontal and laterally upright, as shown in FIG. 14. Secondary index pins 66 on the other support arms 60 are engaged in coordination holes, also predrilled in the web 45, to support the web vertically. The secondary index pins 66 are horizontally compliant, as described in detail below, to accommodate longitudinal growth in the spar web 45 caused by fastener installation. Vacuum in vacuum cups 70 on the ends of the pogos 56 draw the web 45 against front facing surfaces 72 within the vacuum cups 70 to hold the web in the lateral "Z" position established by the extension of the pogos 56.

A machine tool, such as a CNC post mill 75 shown in FIGS. 8 and 9, is supported for longitudinal movement on rails 77 in the cell 50. The post mill 75 has an elongated arm 80 that can be driven in a self-parallel fashion on the body of the post mill 75 in the vertical or "Y" direction, and can also be extended lengthwise. The body of the post mill 75 can be provided with the capability to rotate about its vertical axis if, as described herein, the cell has a line of stanchions on both sides of the cell so the post mill can be performing operations on one side while workers are installing parts, removing completed spars or doing other manual operations on the other side. Finally, the arm 75 has a wrist that can rotate about the axis of the arm 75 and can tilt sideways. A gripping device at the distal end of the wrist has mechanical and power connections for holding and powering one or more end effectors 85 for performing the various functions needed in the assembly cell 50. These axes of motion permit the post mill 75 to position the end effector in any desired position and orientation within the reach of the arm 80.

The post mill 75 shown is supplied by Ingersol Milling Machine Company, but other machine tools, such as a Henri Line gantry mounted 5-axis tool, or an "Aeroflex" six-axis positioner made by Pegard Products, Inc. in Machesney Park, Ill. could be used. The required capabilities are precision and repeatability in spindle positioning, which in this application is about ±0.005″, and operation under control of a machine controller that can be programmed to incorporate digital product definition data originating from an engineering authority for the wing and wing components, so that coordination features specified by the digital product definition can be placed accurately and repeatably by the machine tool 75. These two capabilities enable the machine tool 75 to apply coordination features, such as coordination holes and machined coordination surfaces, to parts, components and assemblies at precisely accurate positions specified in the digital product definition. These coordination features are used to position parts and components relative to each other where they are pinned and fastened, thereby eliminating or drastically reducing the need for fixed hard tooling that previously was used to located the parts and components relative to each other. The coordination features thus determine the relative position of the parts and components that comprise the assembly, and thereby determine the size and shape of the assembly, independently of most tooling.

After the cell is configured for the spar design to be built that day, the upper and lower spar chords 40 and 42 are loaded, as illustrated in FIG. 1, onto temporary chord locators 90 hanging on the pogos 56 for holding the spar chords adjacent to the spar web position in preparation for transfer to the spar web 45. It should be noted that, for convenience, the spar 30 is built in the inverted position because the lower edge of the spar diverges where the spar becomes wider at the inboard end, so building the spar in the inverted position reduces the reach of the scaffolding that may be needed by workers to reach the upper parts of the spar. Therefore, the drawings show the "upper" chord 40 in the bottom position and the "lower" chord 42 in the top position. The chords 40 and 42 are held in position on the temporary chord locators 90 with over-center clamps 92 on the top and bottom ends of the chord locators 90. Sealant is applied to the vertical flange faying surface of the spar chords 40 and 42 where they will contact the spar web 45. The spar web 45 is loaded onto the index pins 64 and 66 on the arms 60 and is drawn against the facing surfaces 72 of the pogos 56 by vacuum in the vacuum cups 70.

Figure 20:
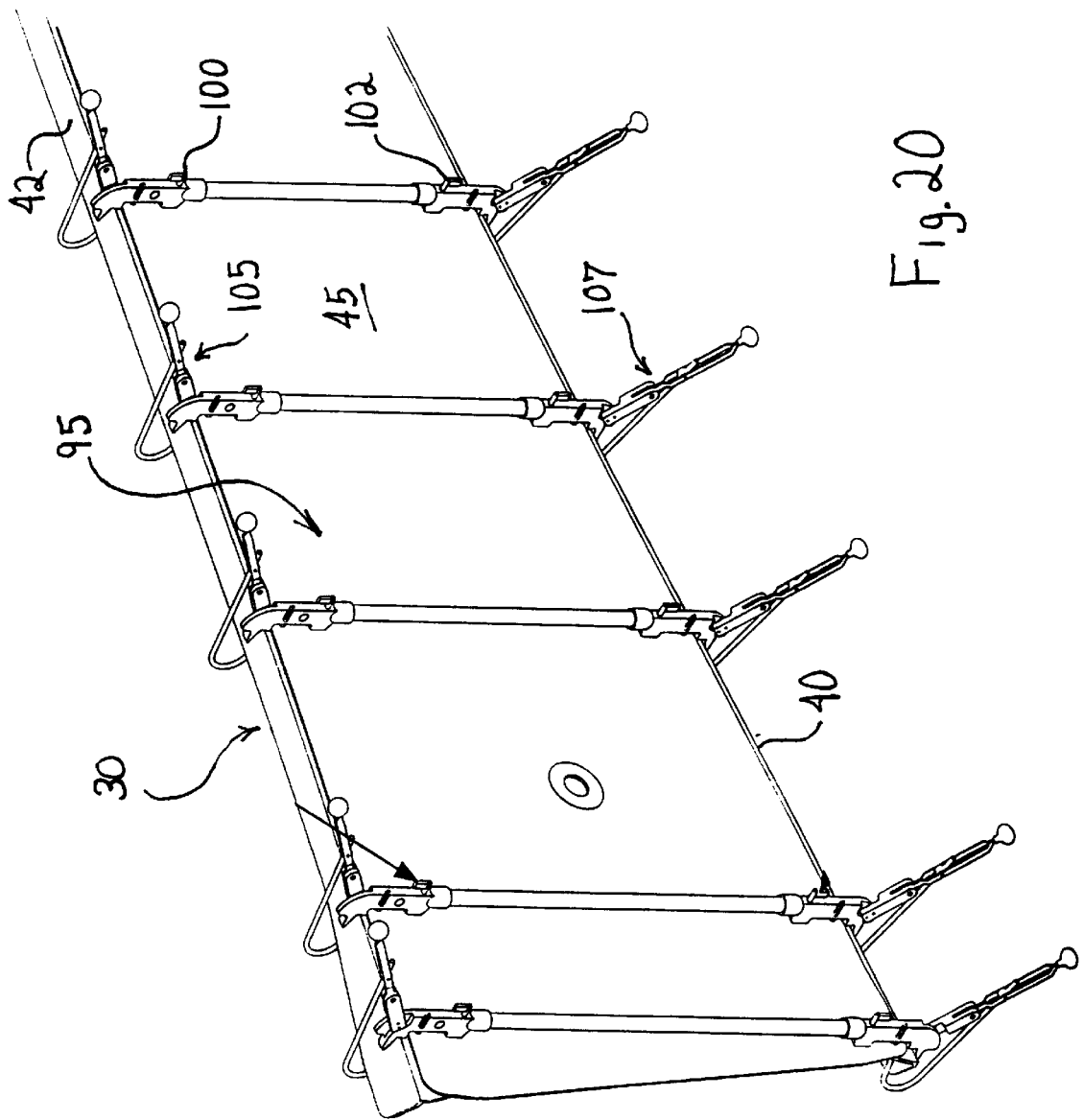
FIG. 20 is a perspective view of chord locator tools holding chords in place on the top and bottom edges of the inboard portion the spar web.
Figure 21:
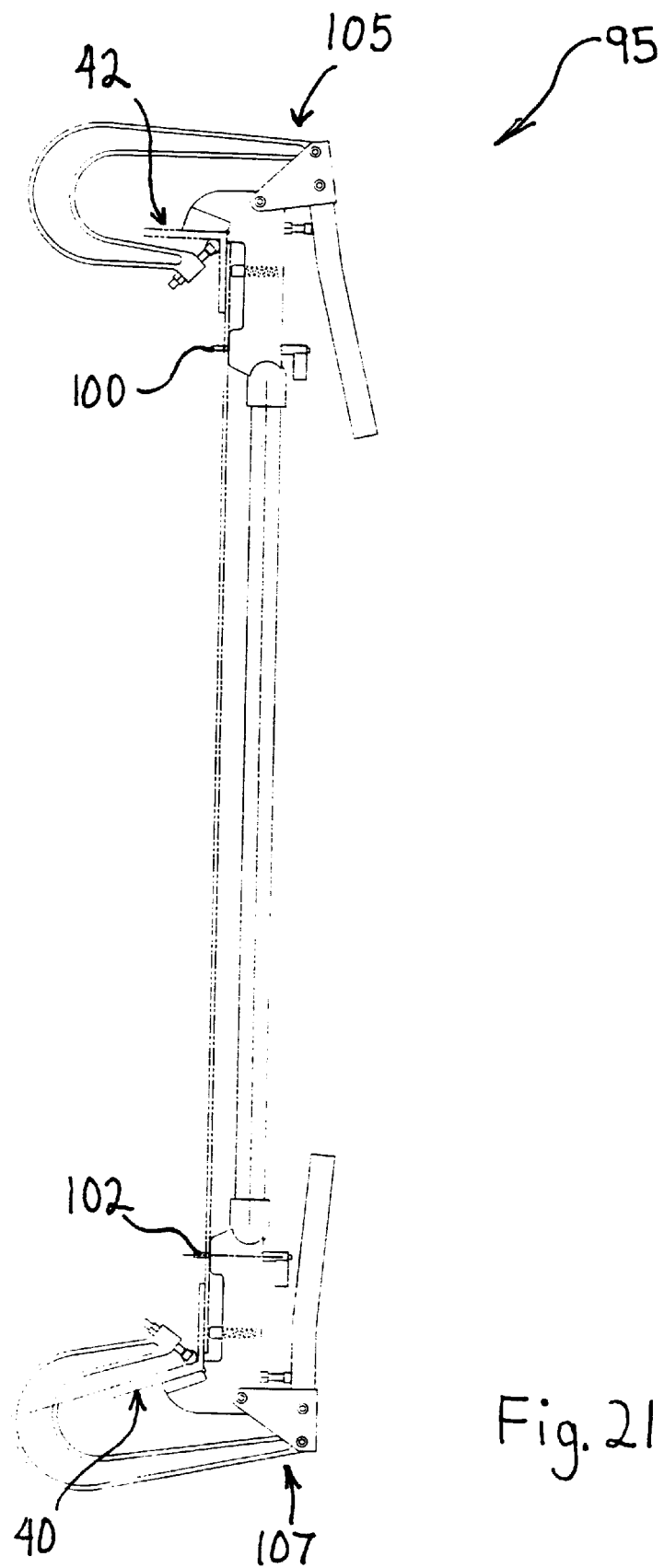
FIG. 21 is a side elevation of a slightly modified form of the chord locator tools shown in FIG. 20.
Figure 22:
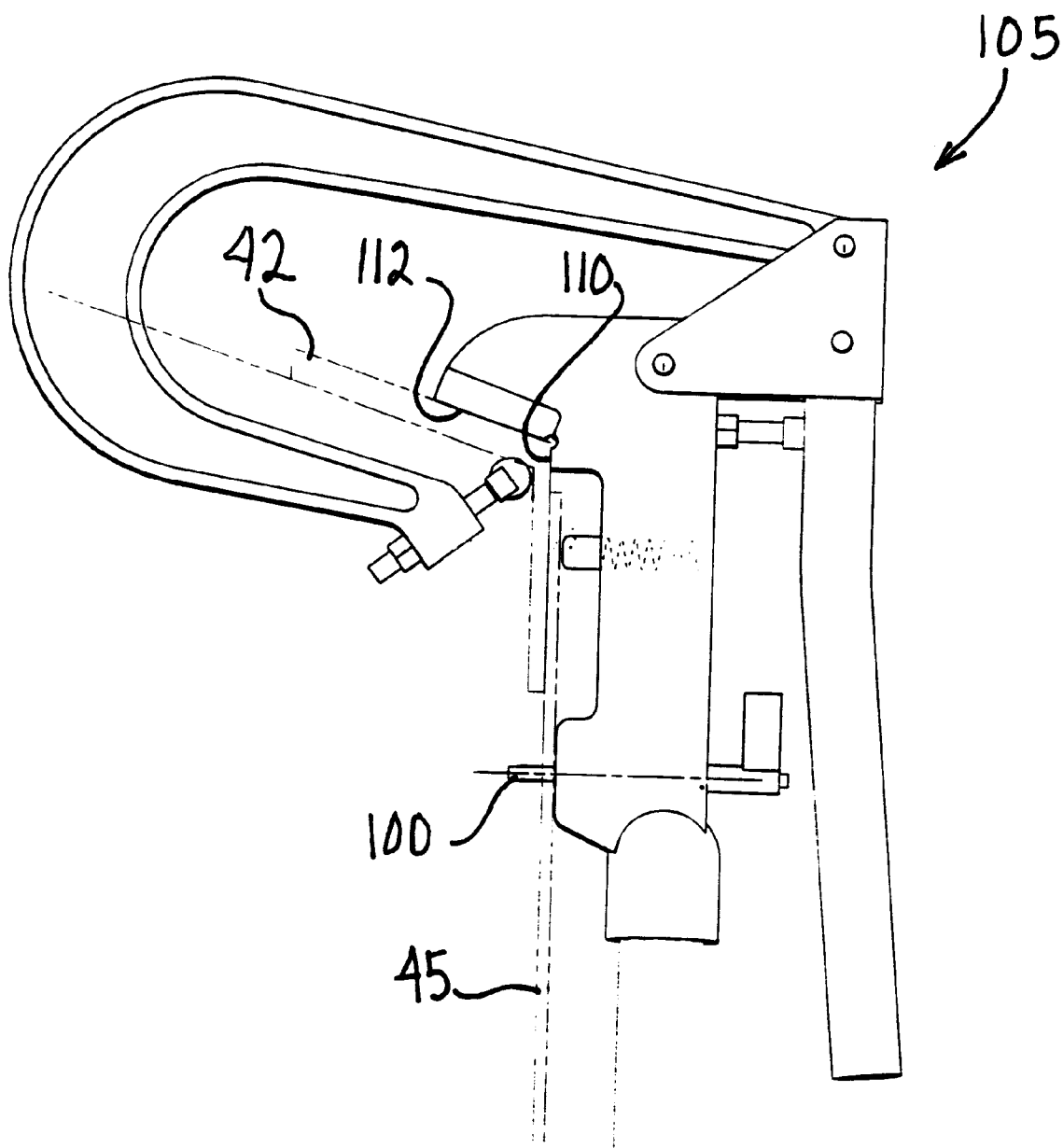
FIG. 22 is an enlarged side elevation of the top end of a chord locator tool like the one shown in FIG. 21, but having chord referencing surfaces set at a different angle, corresponding to the angle of the chord at a different position along its length.
Figure 23:
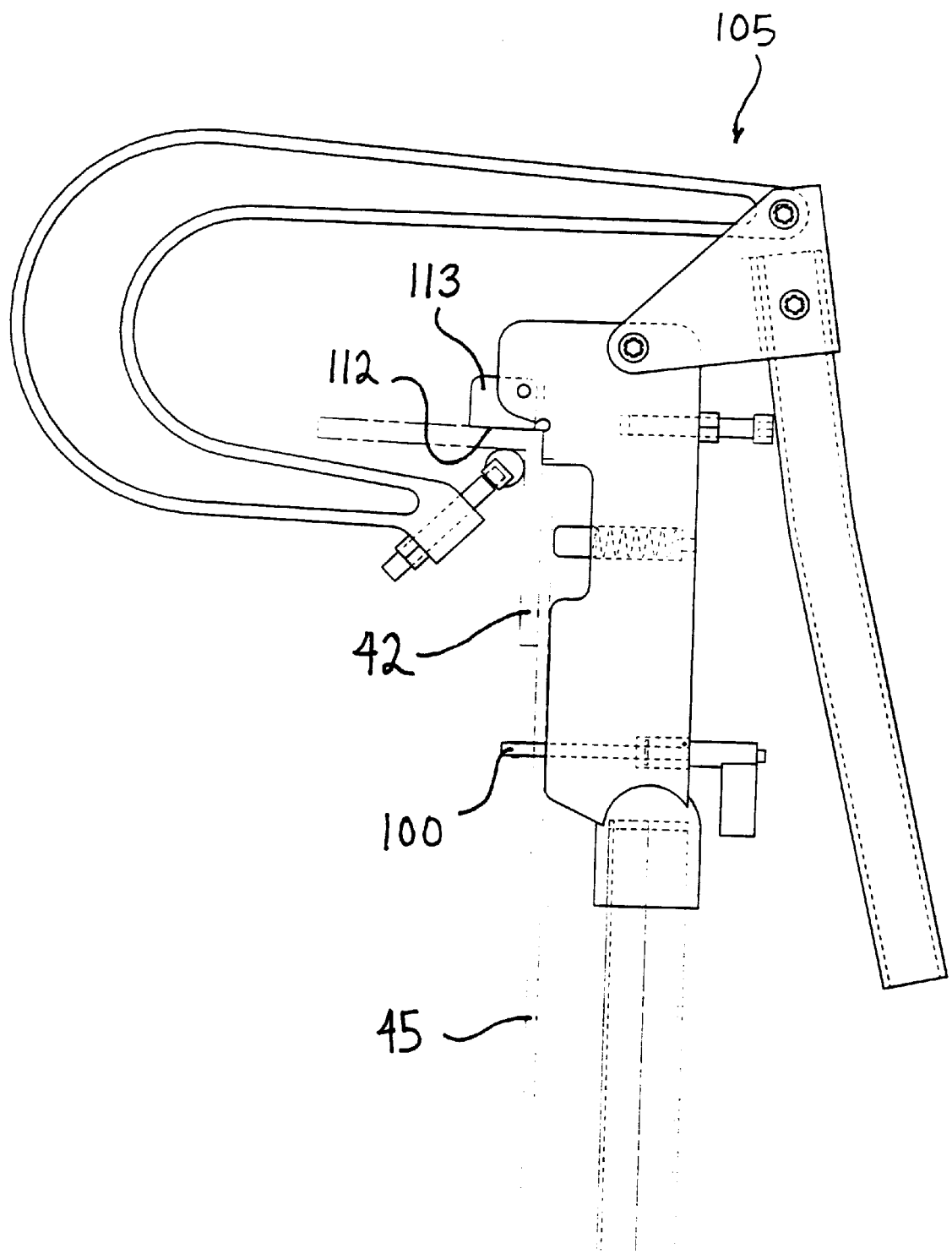
FIG. 23 is a side elevation of the top end of a chord locator tool having a chord locator reference surface on a pivoted heel piece.
Figure 24:
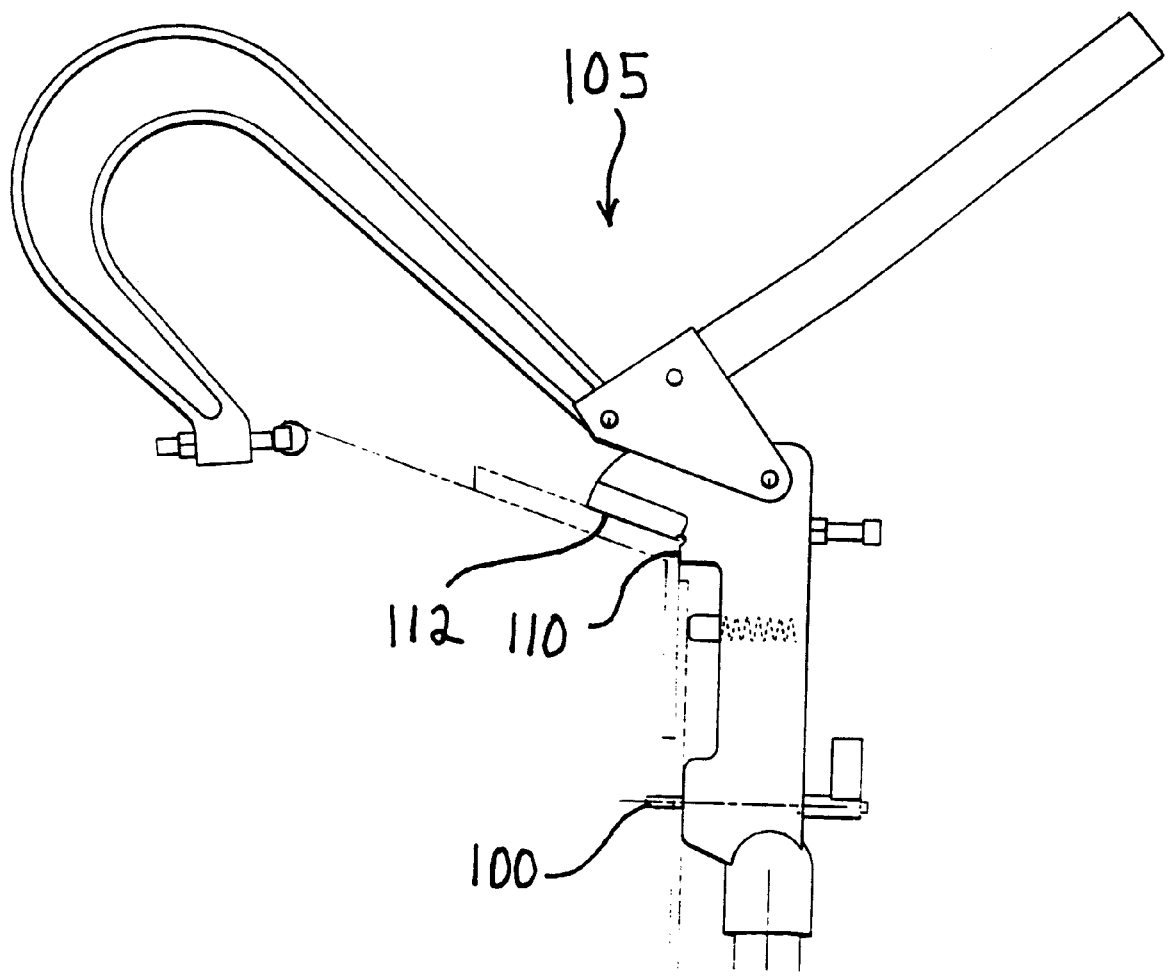
FIG. 24 is a side elevation of the structure shown in FIG. 22, with the clamp in its open position.
Figure 25:
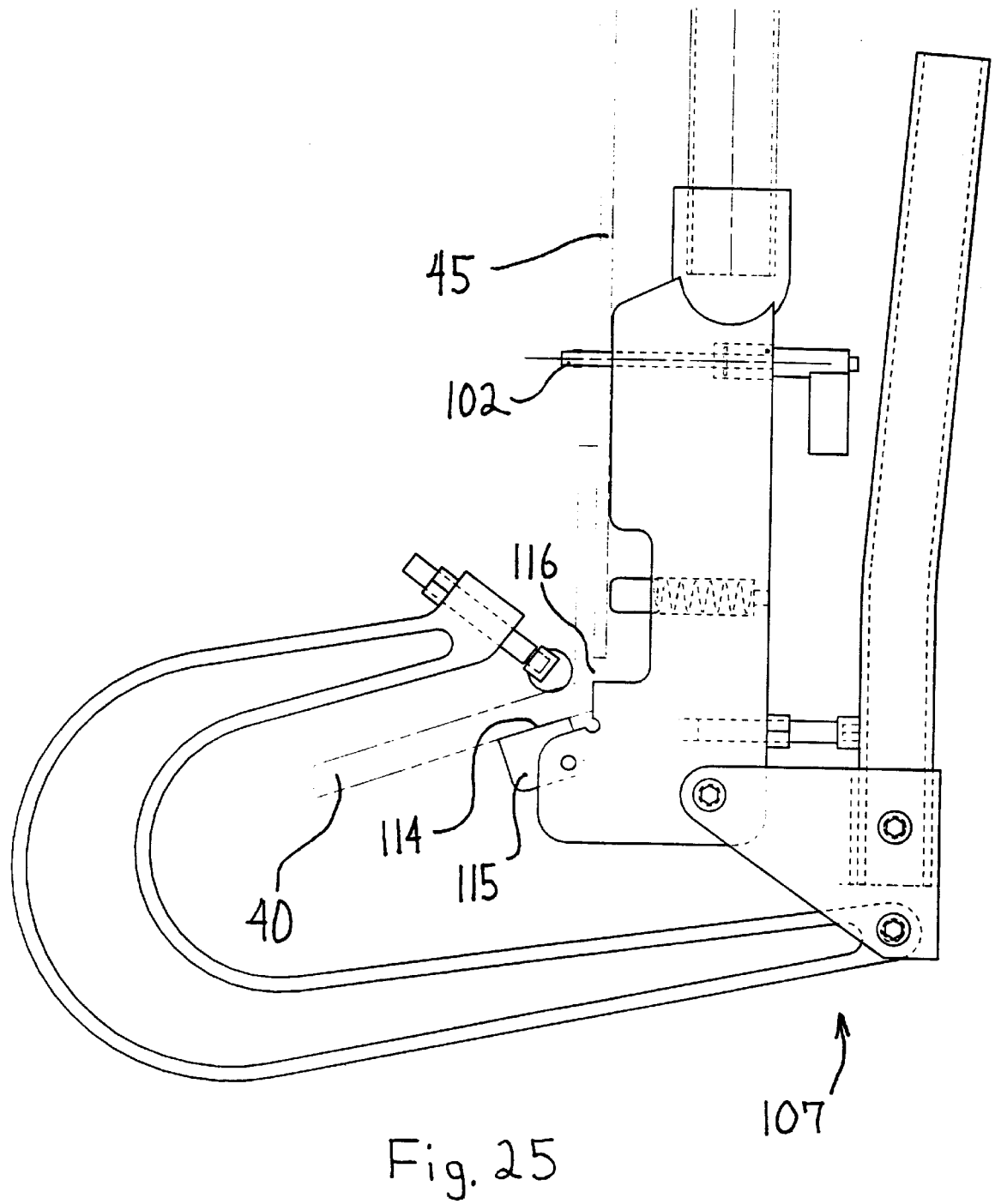
FIG. 25 is an enlarged side elevation of the bottom end of a chord locator tool.
Figure 26:
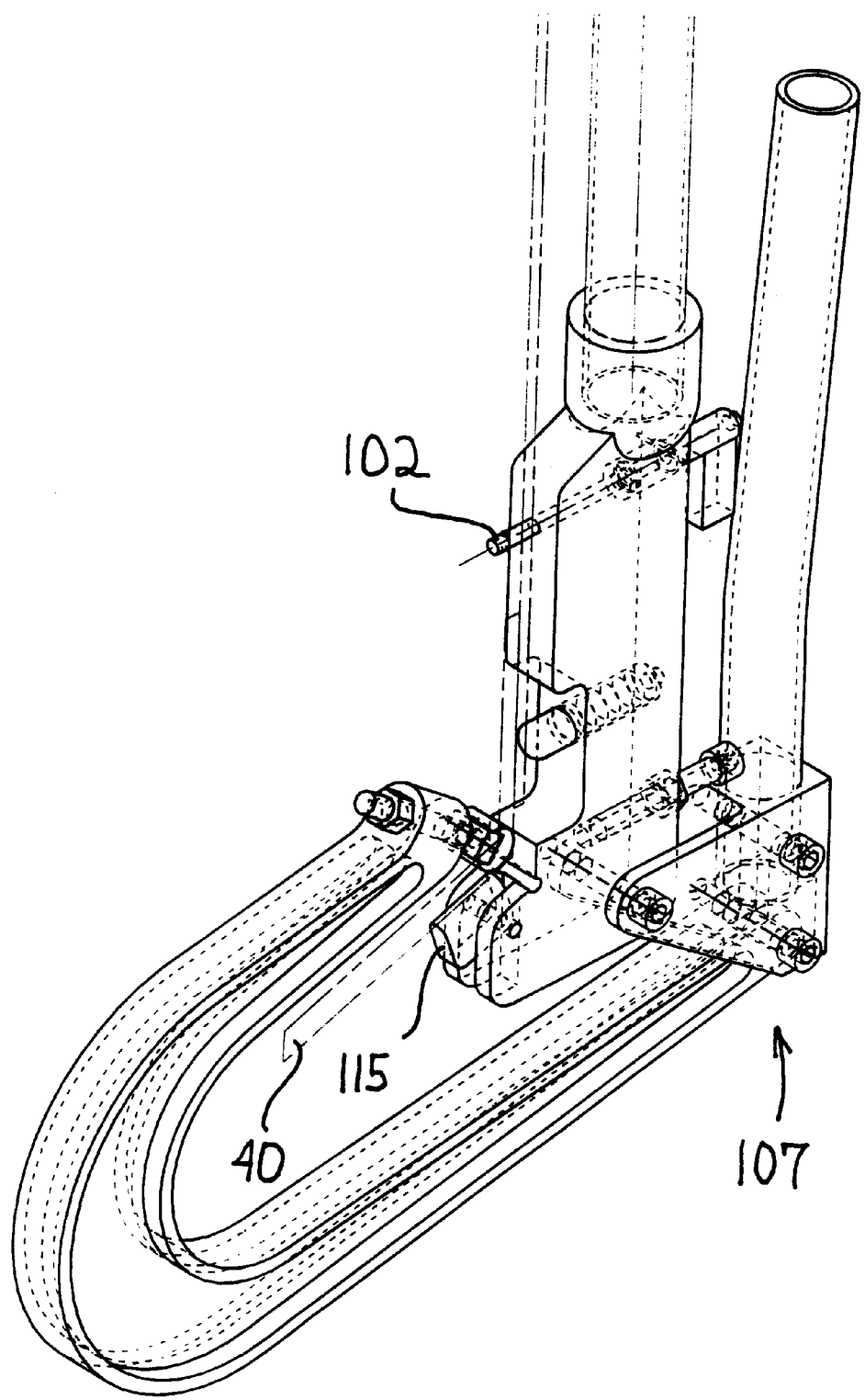
FIG. 26 is an enlarged perspective view of the bottom end of the chord locator tool shown in FIG. 25.
Figure 27:
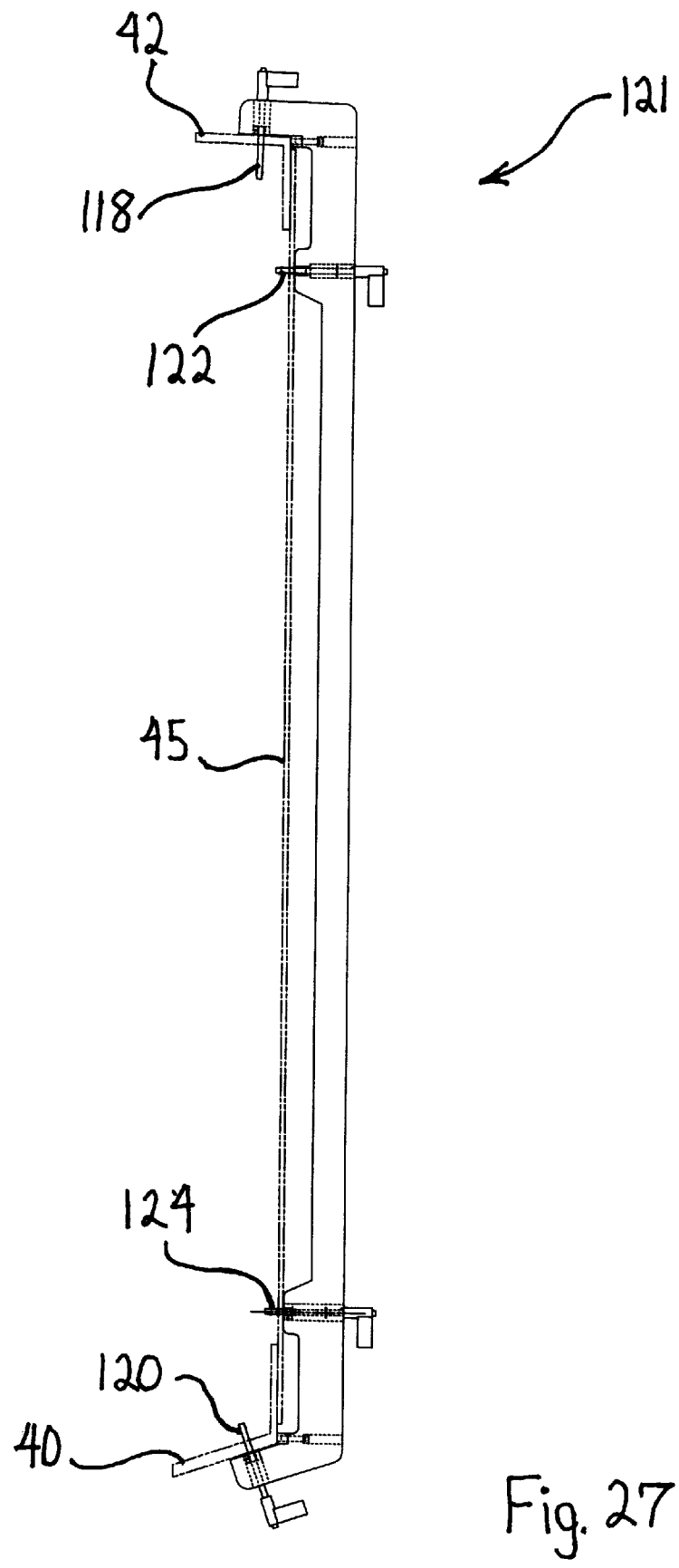
FIG. 27 is a side elevation of a tool for locating the position of the spar chords in the "X" direction.

The position of the chords 40 and 42 in the "Y" direction along the upper and lower edges of the spar web 45 is set by a series of chord-Y tools 95, each of which is, positioned on the spar web 45 by way of a pair of indexing pins 100 and 102 in chord tool coordination holes drilled with extreme positional accuracy in the spar web 45 with a drill controlled by the CNC post mill 75. As illustrated in FIGS. 2 and 20–25, clamps 105 and 107 are attached to the top and bottom ends of each chord tool 95. The clamps on the chord-X tools 95 shown in FIG. 20 are slightly different from those shown in FIGS. 21–25 to show that different types of clamps can be used. The upper clamp 105 has reference surfaces 110 and 112, shown in FIG. 22, for precisely locating the lower chord 42 at the correct vertical position on the web 45. Likewise, the lower clamp 107 has reference surfaces 114 and 116 for precisely locating the upper chord 40 at the correct vertical position on the web 45. The reference surfaces 112 and 114 may be on heel blocks 113 and 115 that are pivotally connected to the chord-Y tools to conform to the angle of the top and bottom flanges of the spar chords, as shown in FIGS. 23 and 25.

Figure 28:
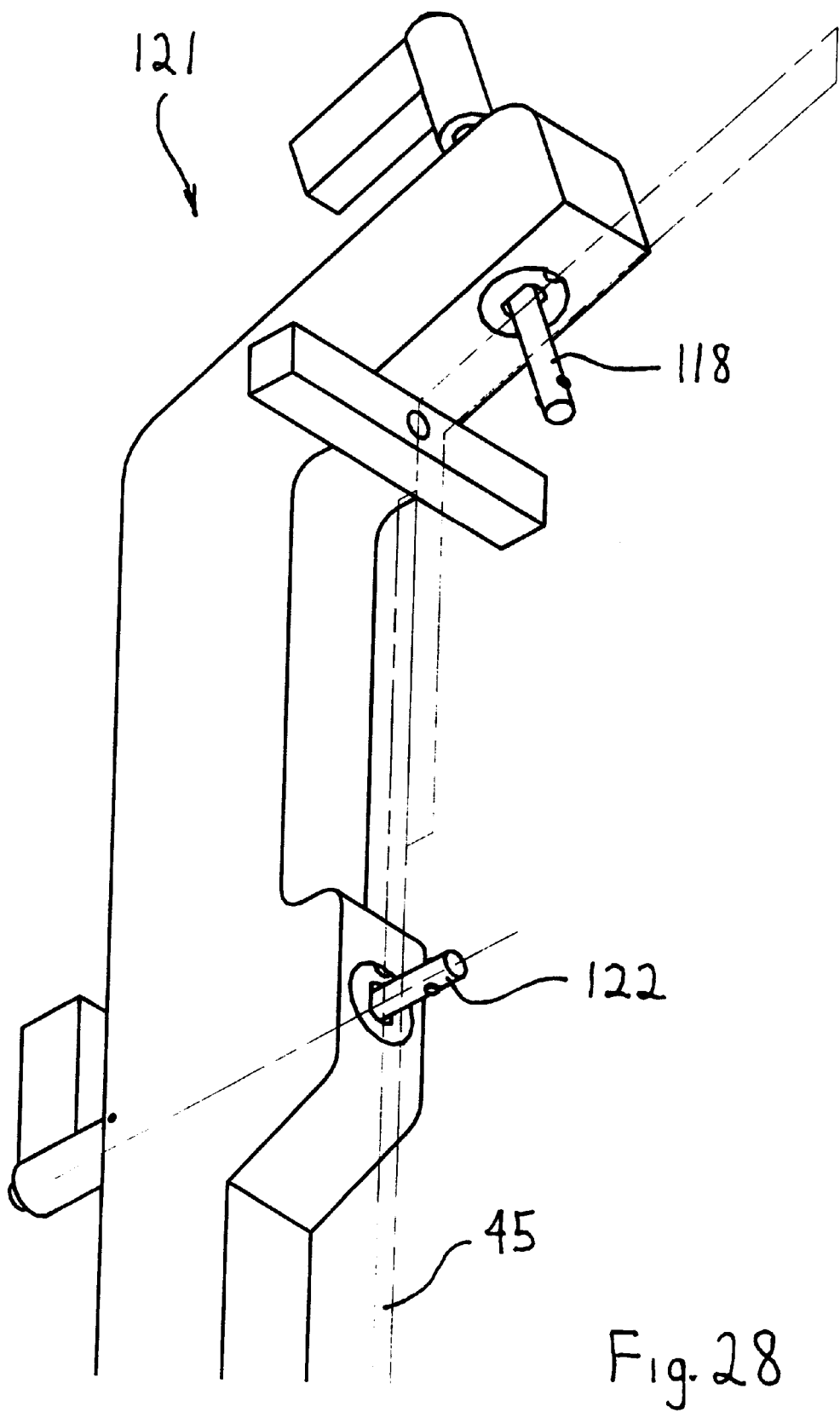
FIG. 28 is a perspective view of the top end of the Chord-X tool shown in FIG. 27.
Figure 29:
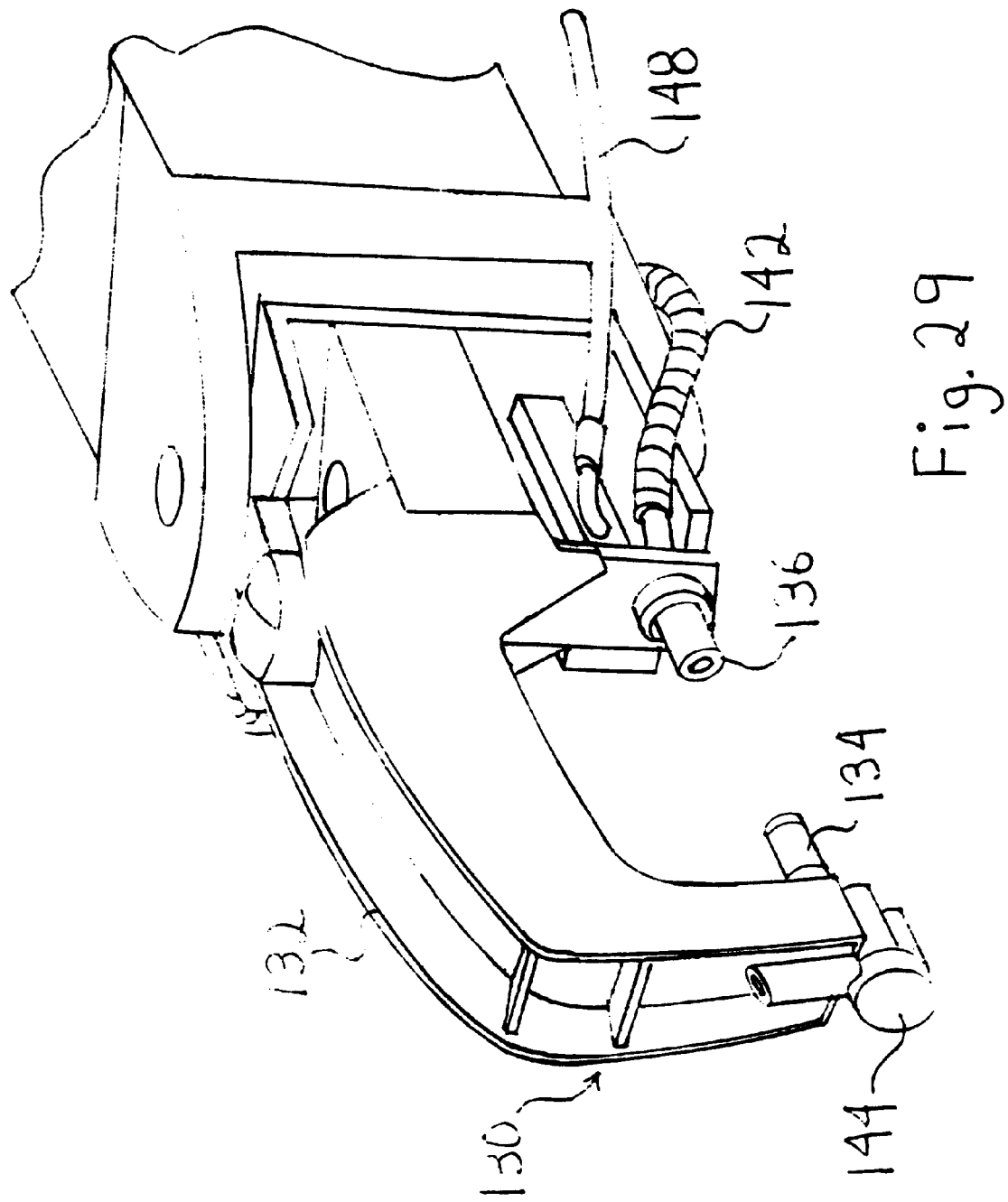
FIG. 29 is a perspective view of a clamping, drilling and fastener feed end effector shown in FIG. 8 to be carried by the post mill and perform fastening operations.
Figure 30:
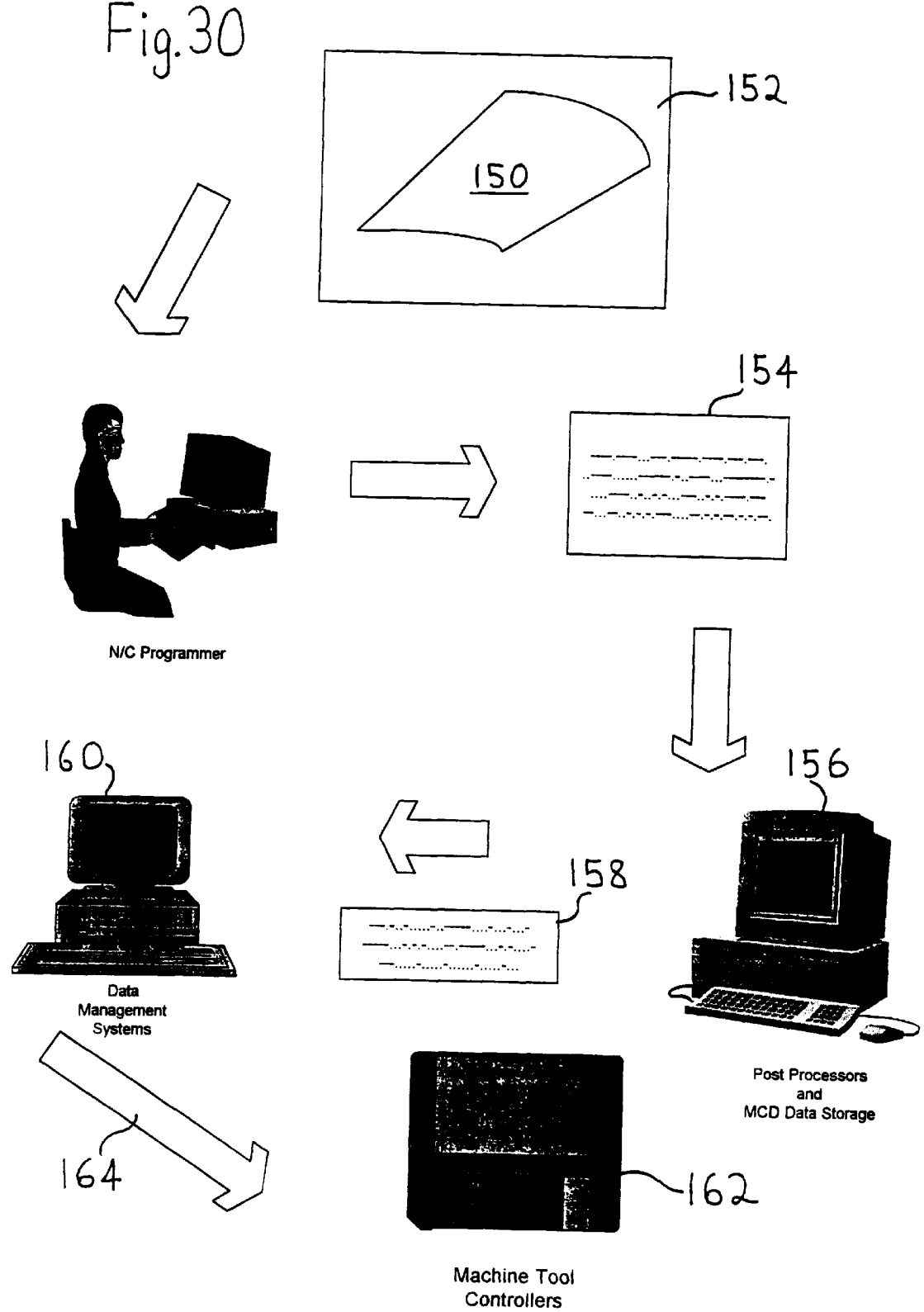
FIG. 30 is a schematic view of a computer architecture and process for converting data from a digital product definition to instruction in a machine tool controller for perform certain assembly operations.
Figure 31:
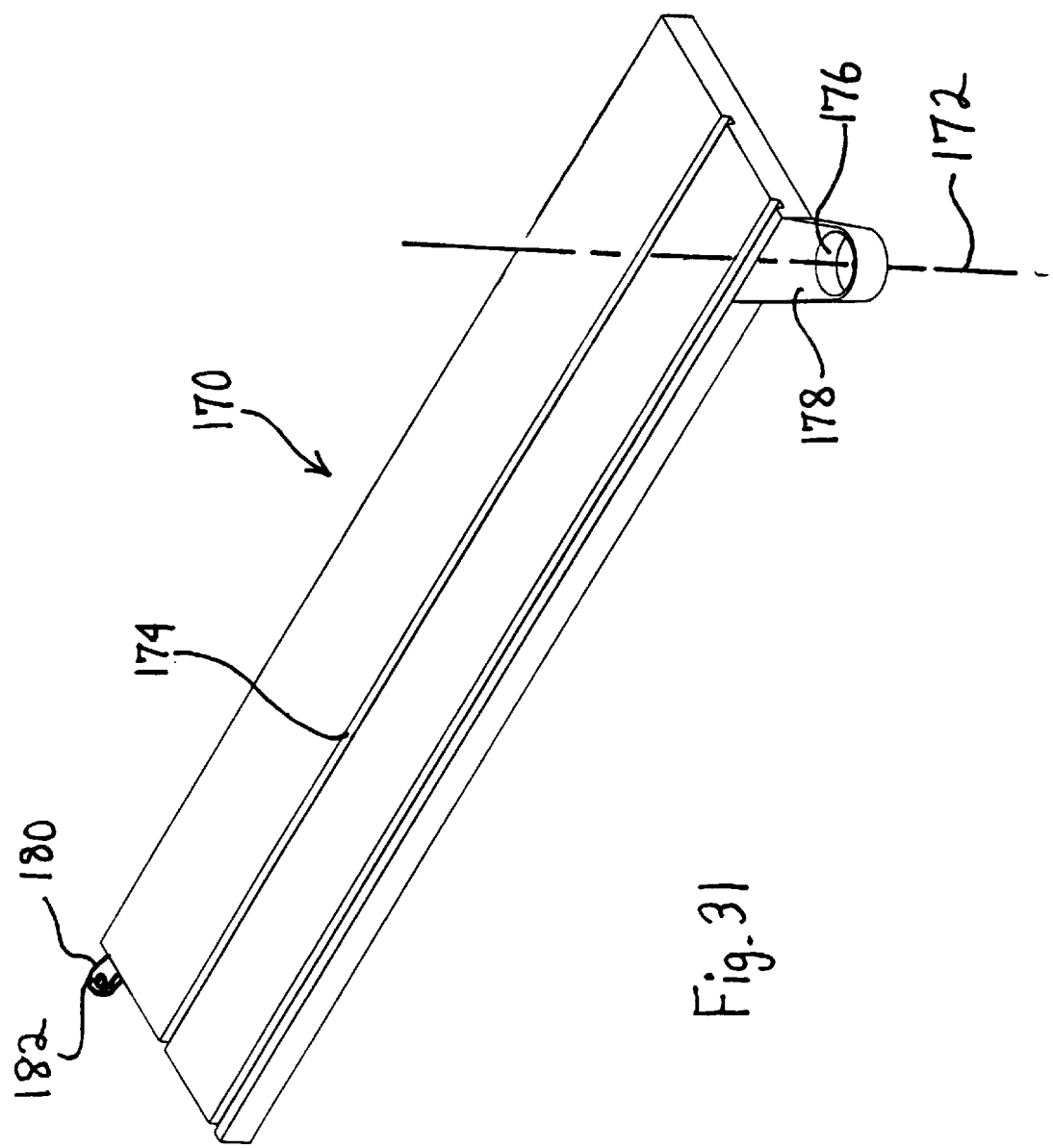
FIG. 31 is a perspective view from the top of the pivoting base plate shown in FIGS. 8–11.

The chords 40 and 42 are transferred from the temporary chord locators 90 onto the chord-Y tools 95 and into position against the chord tool reference surfaces and against the spar web 45 by opening the chord tool clamps, as shown in FIG. 23, and sliding the temporary chord locators 90 on the pogos 56 until the chords contact the web 45. The clamps 92 on the temporary chord locators 90 are released and the chords 40 and 42 are positioned accurately in the "X" direction by registry of index pins 118 and 120 in a chord-X tool 121, shown in FIG. 28, with coordination holes predrilled in the chords 40 and 42. The chord-X tool 121 was previously attached to the web 45 by index pins 122 and 124 extending into coordination holes accurately drilled into the web by the post mill 75 at the same time that the coordination holes for the chord-Y tools 95 are drilled.

The chords 40 and 42, now indexed accurately in the "X" direction with the chord-X tool 121, are pushed into position against the reference surfaces 110–116 of the chord-Y tool 95 to position the chords 40 and 42 against the top and bottom edges of the web 45 accurately in the "Y" direction. The chords 40 and 42 are secured in place against the reference surfaces 110–116 by the chord-Y tool clamps 105 and 107.

A probing routine is now performed to accommodate the deflection of the stanchions 52 and support arms 60 under the weight of the spar web 45 and chords 40 and 42. A probe held by the post mill arm 80 probes the primary index pin 64 and one or more secondary index pins 66 to locate their actual position. A suitable probe for this purpose would be a Renishaw contact tactile probe Model No. MP6 made by the Renishaw Company in Onendagua, N.Y., although other probes available from other sources could also be used. The machine controller for the post mill 75 uses the actual positions of the index pins as located by the probe to normalize the part program in the controller to make it conform to the actual position of the parts on the stanchions 52.

The chords are now fastened to the web 45 with the end effector 85, shown conceptually in FIGS. 1, 3–7 and 29. The end effector 85 is carried and positioned at the locations along the web 45 by the post mill arm 80, as shown in FIG. 8. A clamp 130 on the end effector 85 has a C-frame 132 with an anvil 134 on its distal end that engages the vertical flange of the chords 40 and 42 on the "wet" side of the spar. A pressure foot 136 is aligned opposite the anvil on the other side of the C-frame 132 where it engages the spar web on the opposite side of the web from the anvil and is actuated with a pneumatic cylinder to exert a clamp-up force on the order of 1000–1500 pounds to clamp the chords to the web during drilling and fastener insertion. A frequency controlled spindle motor mounted within the end effector 85 behind the pressure foot 136 rotates and feeds a drill bit to drill holes through an opening in the pressure foot 136 while chips are vacuumed away through a vacuum hose 142. The drill spindle retracts and a hole probe 144 mounted behind the anvil 134 probes the hole drilled through the web and chord flange through an opening in the anvil 134. If the hole quality meets predetermined standards, a shuttle moves behind the pressure foot to align a fastener feed holder with the newly drilled hole, and an interference fit fastener is fed through a line 148 to the holder. A pneumatic hammer drives the fastener into the hole. The pressure foot now unclamps and moves to the next fastener location. Securing the fasteners with swage collars or nuts is performed by workers on the outside of the cell 50 where there is no danger of injury from the post mill 75 inside the cell 50. The workers also remove the chord-Y tools 95 as the post mill 75 approaches their position on the spar 30.

After all the fasteners for the upper and lower spar chords 40 and 42 have been installed, the length distortion of the spar due to the radial and longitudinal compressive loading exerted by the interference fasteners is substantially complete. There will be additional fasteners installed when the rib posts and stiffeners are fastened to the spar, but the length distortion, if any, produced by those operations can be accommodated after they are completed.

After both chords 40 and 42 have been attached, the post mill uses the same end effector 85 or a separate drill-only end effector to drill coordination holes for stiffeners and rib posts. As described below, a master digital model 150 of the spar in the engineering authority for the airplane manufacturer specifies the location of the coordination holes for the rib posts and the stiffeners, and the part program which controls the movement of the post mill 75 is derived from that master digital model 150.

Figure 5:
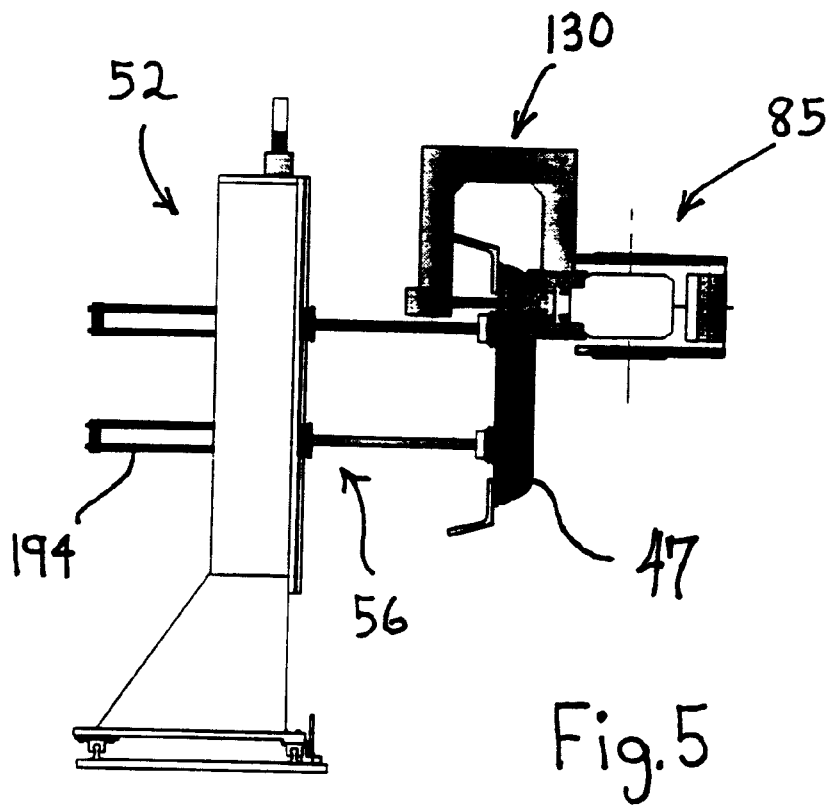
Figure 6:
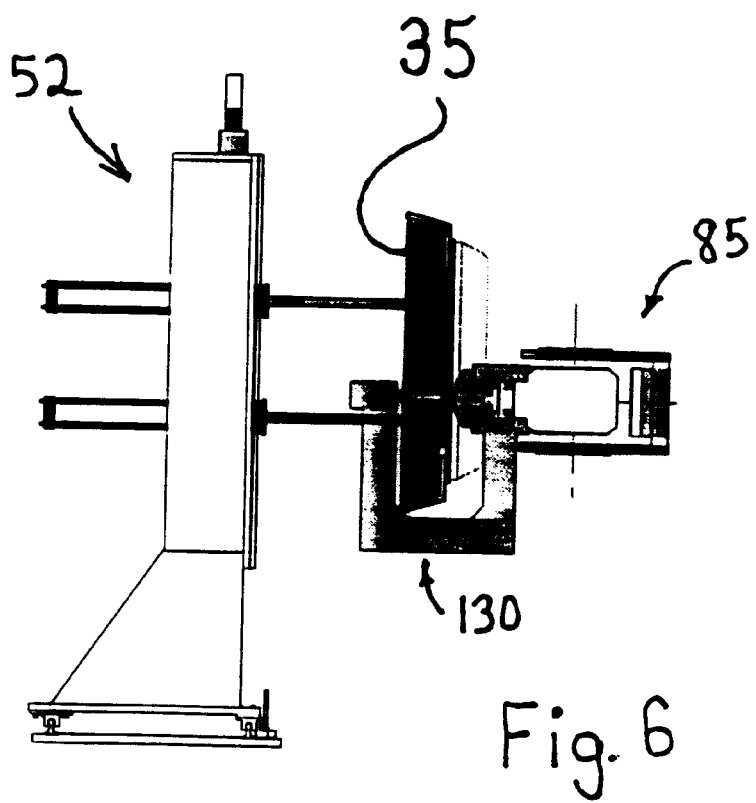

Two different processes are used for attachment of the stiffeners and rib posts, depending on where they are to attached. As shown in FIGS. 7A and 7B, the height of the spar 30 at the inboard end is considerably greater than it is for most of its length. As shown in FIGS. 5 and 6, the depth of the throat of the clamp C-frame may be insufficient to reach the longitudinal centerline of the spar 30. The weight of the end effector 85 is affected by the depth of the C-clamp throat. A deeper throat requires a heavier C-clamp. All post mills have a weight limitation on the amount of weight they can carry on the end of the arm 80. If an end effector 85 with a C-clamp throat deep enough to enable the line of action of the end effector to reach to the centerline of the spar at the inboard end would exceed that weight limitation, then the inboard rib posts 35 and stiffeners 47 could be attached by a semi-automated process, described below.

The stiffeners 47 and rib posts 35 have coordination holes predrilled when they are manufactured, or the coordination holes are drilled in a separate dedicated fixture. The coordination holes correspond to the locations of the coordination holes drilled in the web 45 by the end effector 85. When the coordination holes in the rib post 35 or stiffener 47 are aligned with the corresponding coordination holes drilled in the web 45, the part is positioned with extreme accuracy on the web 45 in accordance with the engineering design as represented by the digital model.

For parts in the portion of the web that are within the reach of the C-clamp throat, the flange of the rip post or stiffener has sealant applied to its faying surface with the web 45 and is temporarily fastened to the web with clecos or some other removable temporary fastener. With the part thus temporarily fixed accurately in position, the end effector 85 is positioned by the post mill arm 80 to clamp the part flange to the web, drill a fastener hole and insert a fastener as described above for the chords 40 and 42. The clamp-up force is sufficient to squeeze out excessive sealant so the drill chips do not have sealant on them which could foul the chip vacuum system, and prevents interlaminar burrs from intruding between the part 35 or 47 and the web 45.

The semi-automated process mentioned above uses the same coordination hole drilling process for establishing the location of the rib posts 35 and stiffeners 47 described above. However, since the C-frame throat of the end effector clamp 132 is not deep enough to enable the centerline of the end effector to reach the inner fastener locations, the holes must be drilled without clamp-up, so interlaminer burrs are likely to occur. Therefore, the parts are temporarily fastened to the web 45 with clecos or the like and the fastener holes are drilled with the end effector 85 or another drilling-only end effector. The clecos are then removed and the parts and web are deburred. Sealant is applied to the faying surfaces and the parts are again temporarily fastened to the web 45 with clecos or the like. Interference fasteners are inserted with pneumatic drivers and the fasteners are secured with swage collars or nuts in the same manner as described above. With the lengthwise growth of the spar because of insertion of interference fasteners substantially completed, the position of certain critical features may now be probed and the part program updated with the actual dimensions of the assembled spar. Using the updated part program, coordination holes are drilled with extreme precision, entirely unaffected by the growth during assembly, for two fittings for connection of a main landing gear beam and certain other fittings such as flap support fittings and aileron hinge line brackets. The spar is now complete and is removed from the cell by crane and transferred to the wing line for installation in a wing.

The digital product definition or digital model 150 is the ultimate engineering authority for the product, in this case, a particular model airplane. It exists on a master computer 152 in a computer-aided design program as the digital model 150 which includes all the dimensions, tolerances, materials and processes that completely define the product. The dimensional data from the model 150 is provided in a file to an NC programmer or an automatic translator where it is used to create a dataset 154 and machine instructions, such as cutter type and size, feed speeds, and other information used by a controller of the post mill 75 to control the operation of the arm 80. The dataset and machine instructions are launched in a post processor 156 where they are converted to a machine readable file 158 that is transmitted to a data management system 160 where it is stored for use by the controllers 162 of the post mill 75. On demand, the file 72 is transmitted over phone lines 164 or other known means of communication to the machine tool controller 162 for use by the controller in operating the post mill 75.

Figure 32:
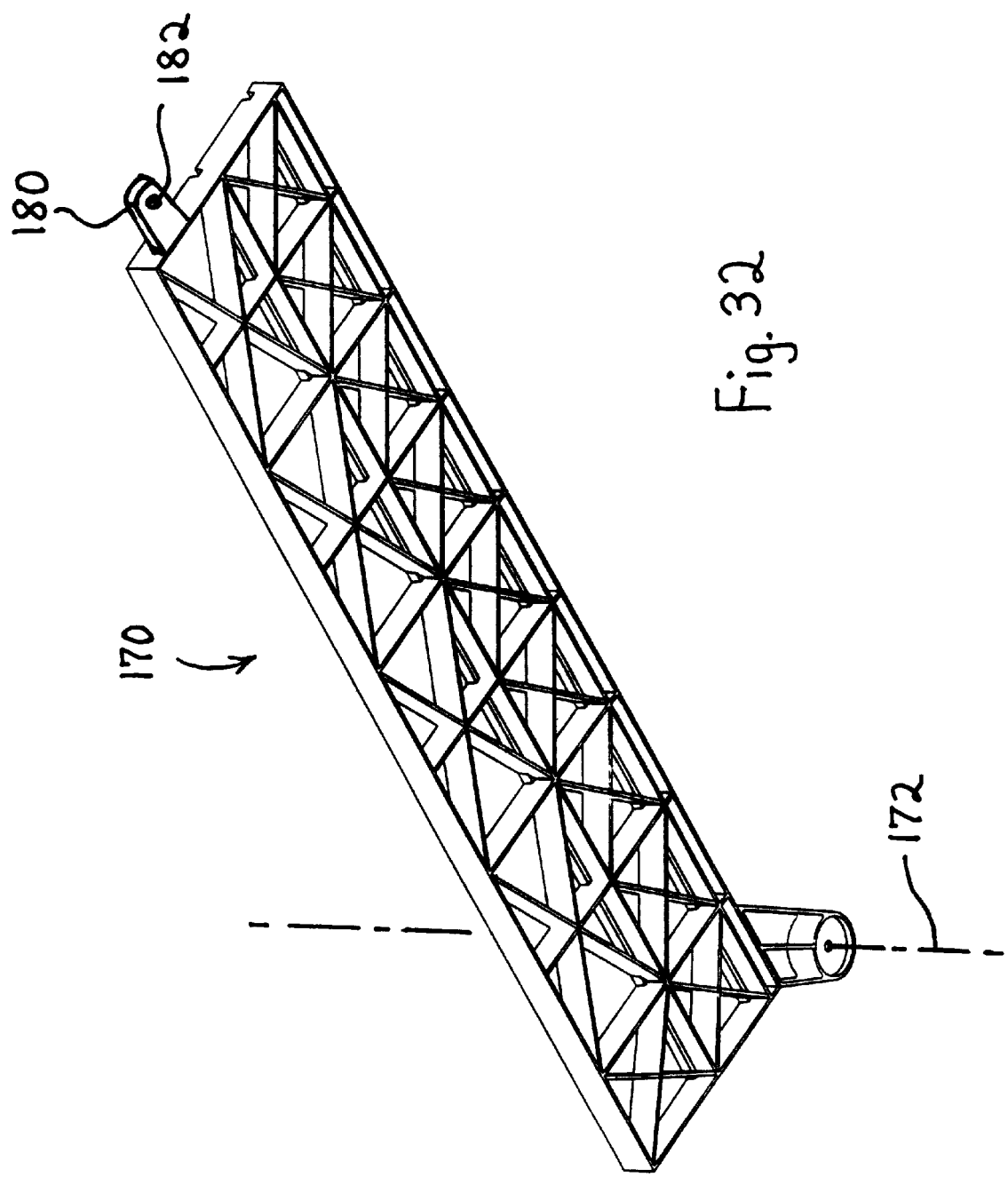
FIG. 32 is a perspective view from the bottom of the pivoting base plate shown in FIG. 31.
Figure 33:
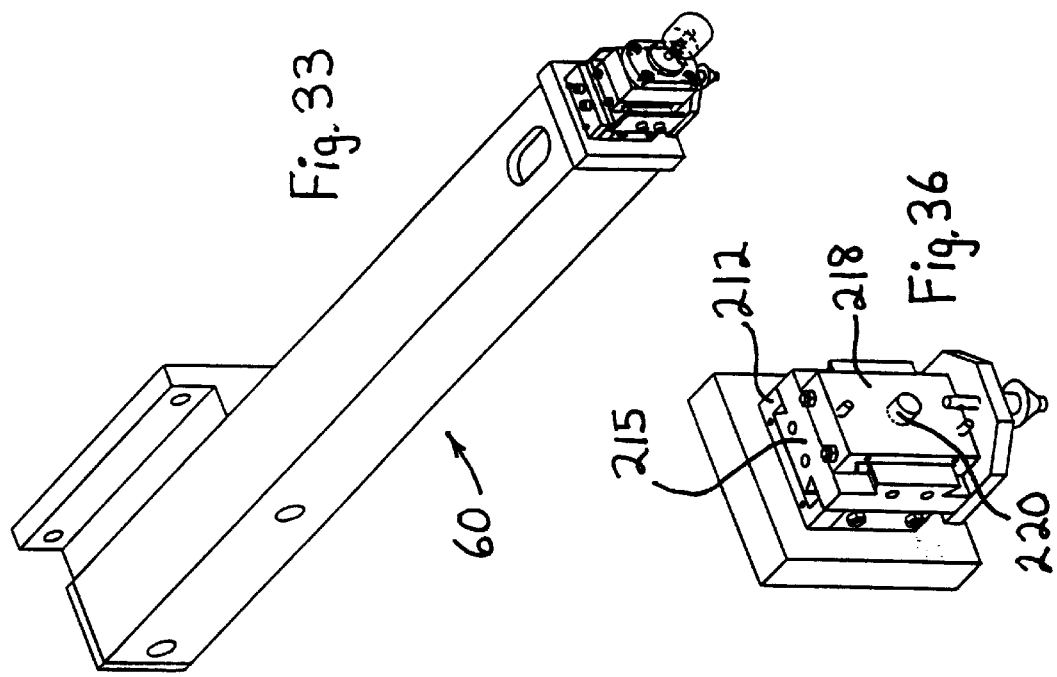
FIG. 33 is a perspective view of the support arm shown in FIGS. 10, 11 and 13.

Referring back to FIGS. 7A, 9 and 10, the bend or kink 46 in the spar is at an angle that is unique to each model airplane. To enable wing spars of several different model airplanes to be made on the assembly cell 50, the stanchions 52 on the inboard side of the bend 46 are mounted on a plate 170 that is pivotally mounted for rotation about a vertical axis 172 that is set to coincide with the "K" axis of the bend 46. The upper surface of the plate 170 has a pair of parallel grooves 174 to receive the tracks 54 on which about six stanchions 52 are slidably mounted. A spherical socket 176 on the end of a wing 178 projecting from the front inner corner of the plate 170 has a receives a spherical bearing ball which enable the plate to swivel about the axis 172 when lifted by air bearings on the underside of the plate 170. A tab 180 projecting from the rear distal end of the plate 170 has a precision index hole 182 for receiving an index pin by which the plate can be indexed to a precision hole in a plate fixed in the floor. Configuring the cell 50 for assembling a spar of a particular model airplane is a simple matter of mobilizing the plate 170 with its air bearings and moving it to the position specified at which the index hole 182 in the tab 180 aligns with the index hole in the floor plate, and turning off the air bearing to allow the plate 170 to settle into hard contact with the floor. The plate 170 is an aluminum casting about 27 feet long and 6 feet wide. It weighs on the order of 5000 pounds, even with an X-brace construction on its underside, shown in FIG. 32, so its weight and the attachments at the tab 182 and the wing 178 anchor it securely to the floor.

Initial Cell Set-Up

When the cell 50 is first built and ready for operation, a series of index holes 185, one for each model airplane spar to be built on that cell 50, is drilled for each stanchion, as shown in FIGS. 12–15. The position of the stanchions 52 along the rails is then easily set by inserting an index pin 187 in a tab 190 of the front of each stanchion 52 in the proper index hole 185, which are suitably labeled to facilitate quick and sure identification by the workers for that purpose.

The vertical position of the pogos 56 are set by adjusting servomotors 192 which drive ball screws threaded into a slide mounted on vertical guides in the stanchions 52. The post mill 75 probes the pogos to confirm that the correct vertical position has been attained and issues a correction to the servomotors if the vertical position is incorrect.

The pogos 56 are all fully extended by pressurizing air cylinders 194 in which the pogo rods 196 are mounted. The cylinders are vented and the post mill 75 extends its arm 80 into contact with the facing surface 72 of the pogo to push each one back to the desired position, whereupon a pneumatic lock 200 is actuated to lock the pogos 56 in the desired position.

Figure 36:
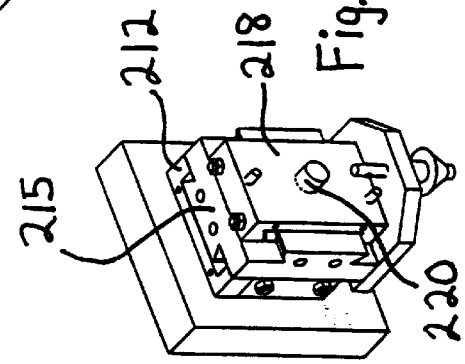
FIGS. 35 and 36 are perspective views of the positioning assembly shown in FIG. 34 in different stages of assembly.
Figure 34:
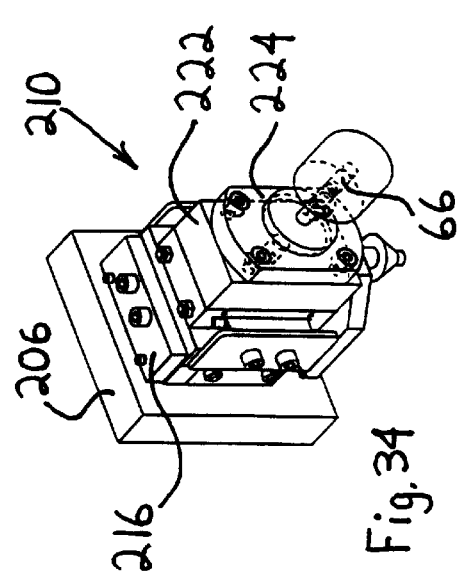
FIG. 34 is a perspective view of a positioning assembly at the distal end of the support arm shown in FIG. 33.
Figure 35:
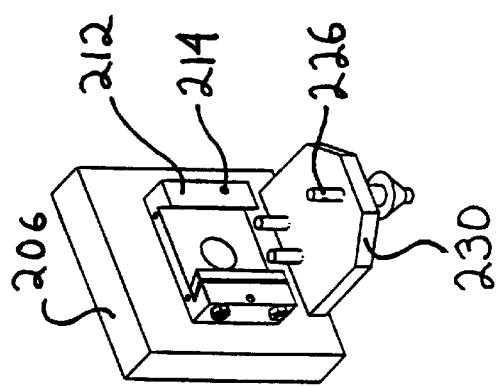

The support arms 60 are indexed to the stanchions 52 by index pins 202 and secured by fasteners 204. As shown in FIGS. 33–36, an end plate 206 on the end of each support arm 60 carries a positioning assembly 210 for the index pins 64 and 66. The first step in setting the position of the index pins 64 and 66 is to "face off" or mill the face of the end plates 206 so they lie on a vertical plane and at the correct lateral position in the cell 50. A vertical dovetail groove plate 212 is positioned on the end plate 206 by index pins in coordination holes predrilled in the vertical dovetail rabbet plate 212 and aligned with corresponding coordination holes drilled in the end plate 206 by the post mill 75. As best shown in FIG. 36, a dovetail tenon plate 215 having a vertical dovetail tenon on its back surface and a horizontal dovetail tenon on its front surface is mounted for vertical adjustment on the vertical dovetail rabbet plate 212, with the vertical tenon on the plate 215 in the rabbet of the plate 212, and is locked in place by a top plate 216 when it is at the correct height in the "Y" direction, as verified by the probe on the post mill arm 80. A horizontal dovetail rabbet plate 218 is mounted on the horizontal tenon of the dovetail tenon plate 215 for horizontal adjustment parallel to the "X" axis. A pin 220 attached to and protruding forwardly from the dovetail tenon plate 215 is received in a lock block 222 to which a mounting plate 224 for the index pins 64 and 66 are attached. The lock block 222 has a vertical hole opening in its lower edge for receiving a ball lock pin 226 which passes up through a corresponding vertical hole in a base plate 230, in turn attached to the lower edge of the dovetail tenon plate 215. The lock block 222 can be locked in position against horizontal movement while it s position is being probed for position by the tactile probe held by the post mill arm 80 during the probing routine, and then can be freed for horizontal movement in the "X" direction during longitudinal growth of the spar 30 by virtue of thermal expansion and installation of interference fasteners. The ball lock pin 226 on the positioning assembly 210 on which the primary index pin 64 is mounted will be retained in its locked position to establish the reference "X" position from which "X" axis growth occurs.

A system is thus disclosed which is usable for assembling airplane wing ribs and spars to a high degree of precision. The determinant assembly concept embodied in this disclosure utilizes the spatial relationships between key features of detail parts and subassemblies, as defined in the digital design and represented by coordination holes and other coordination features put into the parts and subassemblies by a numerically controlled tool, using original part design data from the engineering authority, to control the relative location of detail parts in subassemblies and the relative relationship of subassemblies to each other, making the parts and subassemblies self locating. This concept eliminates the need for traditional hard tooling used for decades in the air frame industry and for the first time enables assembly of large, heavy, flexible and semi-flexible mechanical structures wherein the contour of the structure and the relative dimensions within the structure are determined by the parts themselves rather than the tooling.

Freed in this way from dependence on fixed tooling, the wing spar can now be built to accommodate distortion created by manufacturing processes, such as interference fasteners and cold working, so that attachment of critical features on the wing at precisely accurate positions specified by the engineering design can be scheduled in the manufacturing process after distortion by the upstream processes which would have affected their position or orientation on the wing. The factory can now manufacture wing spars of any shape and size for which engineering data is provided, within the physical range of the CNC machine tools, and do so faster and with far greater precision than was possible with fixed tooling. The cost of building and maintaining the conventional wing spar tooling, and the factory floor space for such fixed tooling, no longer need be amortized and factored into the price of the airplane, and it is now possible to build spars for wings customized to meet the particular requirements of particular customers.

Obviously, numerous modifications and variations of the system disclosed herein will occur to those skilled in the art in view of this disclosure. Therefore, it is expressly to be understood that these modifications and variations, and the equivalents thereof, will be considered to be within the spirit and scope of the invention as defined in the following claims, wherein we claim:

1. A method of accurately assembling parts, including upper and lower chords, on a web to manufacture a wing spar, comprising:

positioning said web rigidly on a fixture in a predetermined spatial orientation accessible by a CNC machine tool;

probing coordination features on said web with a probe with reference to a fixed known location to determine the actual position of said web on said fixture with relation to said fixed known location;

normalizing a machine tool program having locations of said coordination features with said actual locations in space of said coordination features as determined by said probe;

drilling chord locator tool coordination holes with said machine tool using said normalized machine tool program to direct a drill held by said machine tool to locations for mounting chord locator tools on said web;

temporarily mounting said chord locator tools on said web with fasteners through said chord locator tool coordination holes, said chord locator tools each having upper and lower contact surfaces thereon at vertical spacings corresponding to desired vertical spacing of said chords on said web;

supporting said upper and lower chords on said upper and lower contact surfaces of said chord locator tools at precisely accurate positions along upper and lower edges of said web;

clamping said upper and lower chords to said web at said edge positions;

drilling fastener holes through said upper and lower chords and said web and inserting fasteners in said fastener holes;

tightening said fasteners in said fastener holes to securely fasten said upper and lower spar chords to said web; and removing said chord locator tools.

2. A method as defined in claim 1, further comprising:

trimming ends of said upper and lower chords and end edges of said web while still supported in said predetermined spatial orientation, to accurately trim said web and said chords to desired length after growth due to interference between said fasteners and said chords and said web.

3. A method as defined in claim 2, wherein:

said drilling and trimming steps use drills and cutters held in said machine tool, said machine tool being directed to the drilling locations and the trimming surfaces using a machine control program based on a digital dataset taken from digital engineering part definition records.

4. A method as defined in claim 1, further comprising:

mounting rib posts to said web using said chord locator tool coordination holes in said web.

5. A method as defined in claim 1, wherein:

said positioning includes mounting said web on a support stanchion by use of a pin on said support stand through a coordination hole in said web, and holding said web immobile on said support stand.

6. A method as defined in claim 1, wherein:

said probing includes measuring critical and reference dimensions of said support stand with measurement sensors carried by said machine tool to confirm the accuracy of the position of said support stand and the precision of said machine tool, to confirm that said web loaded on said support stand corresponds with the dataset loaded into said computer, and to establish an offset amount by which the data for said part can be offset when drilling and routing said sheet.

7. A method as defined in claim 1, further comprising:

drilling rib post coordination holes in said web with said machine tool at locations that will match with corresponding coordination holes in said rib posts, so that said rib posts will be accurately located when said coordination holes in said rib posts and said web are aligned.

8. A method of accurately assembling parts, including upper and lower spar chords and rib posts, on a spar web to manufacture a wing spar, comprising:

positioning said web on a support stand by use of a pin through a coordination hole in said web and in said support stand, and holding said web immobile on said support stand;

drilling rib post coordination holes in said web at locations that will match with corresponding coordination holes in said rib posts, so that said rib posts will be accurately located when said coordination holes in said rib posts and said web are aligned;

drilling chord locator tool coordination holes in said web at locations for mounting chord locator tools on said web;

mounting said chord locator tools on said web with fasteners through said locator tool coordination holes;

supporting said upper and lower spar chords on said chord locator tools at precisely accurate positions along upper and lower edges of said web;

clamping said upper and lower spar chords to said web at said edge positions;

drilling fastener holes through said upper and lower spar chords and said web and inserting fasteners in said fastener holes;

tightening said fasteners in said fastener holes to securely fasten said upper and lower spar chords to said web;

removing said chord locator tools;

wherein said drilling is done using drills and cutters on a precision computer controlled machine tool that is directed to the drilling locations using a digital dataset taken directly from digital engineering part definition records.

9. A method as defined in claim 8, further comprising:

mounting said rib posts to said spar web using said chord locator tool coordination holes in said web.

10. A method as defined in claim 8, further comprising:

measuring critical and reference dimensions of said support stand with measurement sensors carried by said machine tool to confirm the accuracy of the position of said support stand and the precision of said machine tool, to confirm that said web loaded on said support stand corresponds with the dataset loaded into said computer, and to establish an offset amount by which the data for said part can be offset when drilling and routing said sheet.

11. A method of making wing spars, comprising:

hanging a spar web on a fixture;

probing said spar web with a probe carried by a numerically controlled machine tool to accurately determine the spatial location of a plurality of critical coordination features on said spar web;

drilling a plurality of web coordination holes in said web using a numerically controlled machine tool running on a program incorporating digital wing product definition from an engineering data authority, said web coordination holes being accurately located in a predetermined position on said web such that upper and lower spar chords can be positioned on said web with a vertical separation between them specified by said digital wing product;

clamping said spar chords to said spar web; and fastening said spar chords to said spar web in said predetermined position specified by said digital wing product definition.

12. A method of making wing spars as defined in claim 11, further comprising:

drilling coordination holes in said spar web for rib posts after distorting said spar web with interference fasteners upstream of said rib post position.

13. A method of making wing spars as defined in claim 11, further comprising:

end trimming said spar to a length designated by said digital product definition after distortion by said interference fasteners.

14. A method of making wing spars as defined in claim 11, further comprising:

mounting a spar chord gauge on said web by said coordination holes, said spar chord gauge having upper and lower reference surfaces vertically spaced apart by distance equal to a vertical span specified by said digital wing product for said upper and lower chords, wherein said vertical separation of said spar chords is equal to said vertical span;

clamping said spar chords to said gauge; and fastening said spar chords to said spar web in said predetermined position specified by said digital wing product definition.

15. A chord locator tool for positioning a pair of chords having reference surfaces at a certain desired vertical spacing and position on a web of an airplane wing spar, comprising:

an elongated body having upper and lower contact surfaces adjacent upper and lower ends of said elongated body;

coordination features on said body at positions corresponding to coordination features on said web, such that registry of said coordination features on said body and said web positions said body on said web with said contact surfaces at said desired position of said reference surfaces relative to said web;

whereby said body is positioned on said web by registry of said coordination features of said body with said coordination features of said web and is secured thereto, and said chords are placed in contact with said contact surfaces of said body to accurately locate said chords at said desired position relative to each other and said web where they may be drilled by a machine tool to provide fastener holes by which said chords may be attached to top and bottom edges of said web.

16. A chord locator tool as defined in claim 15, further comprising;

clamps attached to said body at said upper and lower ends thereof, said clamps having clamp arms that engage said chords and hold said chords against said contact surfaces of said body.

17. A chord locator tool as defined in claim 15, further comprising;

standoffs on said body for contacting said web at certain positions free of obstructions;

whereby said body lies parallel to said web when said coordination features are in registry, and when said standoffs are in contact with said body and said body is fastened to said web.

18. A chord locator tool as defined in claim 17, wherein:

said coordination features in said body include a coordination hole through at least one of said standoffs, said coordination hole sized to receive a temporary fastener to temporarily secure said body to said web.

19. A chord locator tool as defined in claim 15, wherein:

said web is a spar web and each of said chords includes a vertical flange and an angled flange; and said contact surfaces of said body each include a vertical surface and a angled surface that uniquely position said chords at said desired position when said vertical and angled surfaces of said chords are positioned in contact with said vertical and angled contact surfaces of said body.

20. A chord locator tool as defined in claim 15, wherein:

said coordination features and said contact surfaces on said body are machined by said machine tool under control of said machine controller using data from said digital product definition.

21. A method of assembling an airplane wing component having an upright web with upper and lower edges, and upper and lower chords attached to said upper and lower edges of said web at predetermined positions on said web and at predetermined vertical spacings between said chords, said chords defining between them a critical thickness profile for a wing in which said wing component is to be installed, comprising:

supporting said web rigidly in a predetermined spatial orientation accessible by a precision machine tool controlled by a computer operated machine controller;

producing a control program for said controller with data from digital part definition records in an engineering authority for said part;

loading and running said control program to operate said controller and drive said machine tool to machine coordination features in said web with cutting tools mounted in said machine tool;

registering said coordination features relative to coordination features on said chords to position said chords at said predetermined positions on said web with a high degree of precision;

clamping said chords to said web at said predetermined positions on said web and at said predetermined vertical spacings between said chords; and fastening said chords to said web at said predetermined positions thereon.

22. A method of assembling an airplane wing component as defined in claim 21, wherein said fastening of said chords to said web includes:

drilling fastener holes through said web and said chords using a drill bit in said machine tool under control of said controller programmed with a program incorporating said digital wing product definition data specifying locations of said fastener holes; and inserting fasteners in said holes and securing said fasteners in place to securely fasten said chords to said web.

23. A method of assembling an airplane wing component as defined in claim 21, further comprising:

trimming said web and said chords to a wing component length specified in said digital product definition, using a cutting tool in said machine tool under control of said controller programmed with a program incorporating said digital wing product definition data specifying said wing component length.

24. A method of assembling an airplane wing component as defined in claim 21, further comprising:

after completion of said fastening step and growth of said wing component length caused by said fastening step, drilling at least one installation coordination hole in said wing component using a drill bit in said machine tool under control of said controller programmed with a program incorporating said digital wing product definition data specifying a location of said installation coordination hole which positions said wing component at a position in said wing when said installation coordination hole is aligned with corresponding coordination features in other wing components in said wing.

25. An airplane wing component made by the process defined in claim 21.

26. An airplane wing component, comprising:

an elongated upright web having upper and lower flanges for fastening to upper and lower wing panels, said flanges having installation coordination holes drilled therein for accurately locating said wing component relative to said wing panels to produce a wingbox;

said installation coordination holes drilled in said flanges using a drill bit in a machine tool under control of a controller programmed with a program incorporating digital wing product definition data from an ultimate engineering authority that specifies locations of said installation coordination holes for positioning said wing component relative to said wing panels at a position specified in said digital wing product definition when said installation coordination holes are aligned with corresponding coordination holes in said wing panels.

27. An airplane wing component as defined in claim 26, further comprising:

upper and lower chords fastened to upper and lower edges of said web, said upper and lower flanges forming part of said upper and lower chords, respectively;

fasteners extending through fastener holes in said chords and said web for fastening said chords to said web;

said chords being located on said web by registration of coordination features on said chords and said web.

28. An airplane wing component as defined in claim 26, further comprising:

at least one of said fastener holes being located at a position of a common coordination hole drilled in said web and said chord.

29. A determinantly assembled airplane wing spar, comprising:

an elongated upright web;

upper and lower chords fastened to said web by chord-to-web fasteners extending through chord-to-web fastener holes;

rib posts fastened to said web by post-to-web fasteners extending through post-to-web fastener holes;

at least some of said post-to-web fastener holes coinciding in position with post-to-web coordination holes drilled by a precision machine tool operating under the control of a machine controller programmed with a part program incorporating digital wing product definition data from an ultimate engineering authority that specifies locations of said post-to-web coordination holes for positioning said rib posts relative to said web at a position specified in said digital wing product definition when said post-to-web coordination holes are aligned with corresponding coordination holes in said web.

30. A determinantly assembled airplane wing spar as defined in claim 29, wherein:

said upper and lower chords are positioned relative to each other and to said web prior to fastening by registering coordination features on said chords relative to coordination features accurately machined in said web.

31. A determinantly assembled airplane wing spar as defined in claim 30, wherein:

said registration of coordination features on said chords with coordination features in said web includes aligning coordination holes in a chord locator tool with coordination holes in said web, and engaging contact surfaces on said chord locator tool with reference surfaces on said chords.

32. A determinantly assembled airplane wing spar as defined in claim 31, wherein:

said reference surface of said chords include a upper surfaces which contacts said wing panels in said assembled wingbox.

33. A determinantly assembled airplane wing spar as defined in claim 29, wherein:

at least some of said post-to-web coordination holes being used for positioning said chord locator tools.

* * * * *